(12) United States Patent
Xiu et al.

(10) Patent No.: US 11,470,344 B2
(45) Date of Patent: Oct. 11, 2022

(54) FRAME-RATE UP CONVERSION WITH LOW COMPLEXITY

(71) Applicant: Vid Scale, Inc., Wilmington, DE (US)

(72) Inventors: Xiaoyu Xiu, San Diego, CA (US); Yuwen He, San Diego, CA (US); Yan Ye, San Diego, CA (US)

(73) Assignee: VID SCALE, INC., Wilmington, DE (US)

( * ) Notice: Subject to any disclaimer, the term of this patent is extended or adjusted under 35 U.S.C. 154(b) by 0 days.

(21) Appl. No.: 16/965,571

(22) PCT Filed: Jan. 28, 2019

(86) PCT No.: PCT/US2019/015449
§ 371 (c)(1),
(2) Date: Jul. 28, 2020

(87) PCT Pub. No.: WO2019/148117
PCT Pub. Date: Aug. 1, 2019

(65) Prior Publication Data
US 2021/0051340 A1 Feb. 18, 2021

Related U.S. Application Data

(60) Provisional application No. 62/623,143, filed on Jan. 29, 2018.

(51) Int. Cl.
*H04N 19/56* (2014.01)
*H04N 19/176* (2014.01)
*H04N 19/57* (2014.01)

(52) U.S. Cl.
CPC ........... *H04N 19/56* (2014.11); *H04N 19/176* (2014.11); *H04N 19/57* (2014.11)

(58) Field of Classification Search
CPC ...... H04N 19/56; H04N 19/176; H04N 19/57; H04N 19/513
(Continued)

(56) References Cited

U.S. PATENT DOCUMENTS

| 8,902,971 B2 * | 12/2014 | Pace | .................. G06T 9/001 |
| | | | 375/240.02 |
| 10,798,399 B1 * | 10/2020 | Wei | .................. H04N 19/137 |

(Continued)

FOREIGN PATENT DOCUMENTS

| JP | 2015076766 A | 4/2015 |
| WO | 2019010156 A1 | 1/2019 |
| WO | 2019032765 A1 | 2/2019 |

OTHER PUBLICATIONS

International Search Report and Written Opinion of the International Searching Authority for PCT/US2019/015449 dated May 3, 2019, 10 pages.

(Continued)

*Primary Examiner* — Tung T Vo
(74) *Attorney, Agent, or Firm* — Invention Mine LLC

(57) ABSTRACT

Systems and methods are described for selecting a motion vector (MV) to use in frame-rate up conversion (FRUC) coding of a block of video. In one embodiment, a first set of motion vector candidates is identified for FRUC prediction of the block. A search center is defined based on the first set of motion vector candidates, and a search window is determined, the search window having a selected width and being centered on the search center. A search for a selected MV is performed within the search window. In some embodiments, an initial set of MVs is processed with a clustering algorithm to generate a smaller number of MVs that are used as the first set. The selected MV may be subject to a motion refinement search, which may also be performed over a constrained (Continued)

search range. In additional embodiments, search iterations are constrained to limit complexity.

20 Claims, 16 Drawing Sheets

(58) Field of Classification Search
USPC .................................................. 375/240.16
See application file for complete search history.

(56) References Cited

U.S. PATENT DOCUMENTS

| | | | |
|---|---|---|---|
| 2009/0168884 A1 | 7/2009 | Lu | |
| 2012/0128071 A1* | 5/2012 | Celetto | H04N 19/117 375/240.16 |
| 2013/0170541 A1* | 7/2013 | Pace | H04N 19/149 375/240.02 |
| 2013/0251040 A1 | 9/2013 | Lu | |
| 2015/0124874 A1* | 5/2015 | Pace | H04N 19/167 375/240.08 |
| 2017/0208341 A1 | 7/2017 | Kulakov | |
| 2017/0347117 A1 | 11/2017 | Bici | |
| 2019/0164296 A1* | 5/2019 | Chikkerur | G06K 9/623 |
| 2019/0273920 A1* | 9/2019 | Zhao | H04N 19/119 |
| 2020/0236388 A1* | 7/2020 | Esenlik | H04N 19/56 |

OTHER PUBLICATIONS

Bross, Benjamin, et al., "High Efficiency Video Coding (HEVC) Text Specification Draft 10 (for FDIS and Last Call)". Joint Collaborative Team on Video Coding (JCT-VC), Document No. JCTVC-L1003. Jan. 2013, 310 pages.
Chen, J., et al., "Coding Tools Investigation for Next Generation Video Coding". Qualcomm Incorporated, Telecommunication Standardization Sector ITU-T SG16/Q6, Doc. COM16-C806, Jan. 2015.
Alshina, E., et. al., "Known Tools Performance Investigation for Next Generation Video Coding". ITU—Telecommunications Standardization Sector, SG16/Q6, Video Coding Experts Group (VCEG), Jun. 2015, VCEG-AZ05, 7 pages.
Karczewicz, M., et. al., "Report of AHG1 on Coding Efficiency Improvements". ITU—Telecommunications Standardization Sector, Video Coding Experts Group (VCEG), SG16/Q6, VCEG-AZ01, Jun. 2015, 2 pages.
Ohm, Jens-Rainer., et. al., "Report of AHG on Future Video Coding Standardization Challenges". International Organization for Standardization, Coding of Moving Pictures and Audio, ISO/IEC JTC1/SC29/WG11 MPEG2014/M36782, Jun. 2015, 4 pages.
Wikipedia, "k-means Clustering". Wikipedia article, updated on May 2, 2016, retrieved from: https://en.wikipedia.org/w/index.php?title=K-means_clustering&oldid=718199503, 12 pages.
Bross, Benjamin, et al., "Inter-picture prediction in HEVC". High Efficiency Video Coding (HEVC), Chapter 5, (2014), pp. 113-140.
ITU-T Rec H.264 and ISO/IEC/MPEG 4 part 10, Advanced video coding for generic audiovisual services, Nov. 2007 (564 pages).
SMPTE 421M, "VC-1 Compressed Video Bitstream Format and Decoding Process". SMPTE Standard, 2006, (493 pages).
Chen, Jianle, et. al., "Algorithm Description of Joint Exploration Test Model 6" Join Video Exploration Team (JVET) of ITU-T SG 16 WP 3 and ISO/IEC JTC 1/SC 29/WG 11, JVET-F1001-v2, Mar. 31-Apr. 7, 2017 (48 pages).
Seo, Jungdong, et. al. "Simplification and improvements on FRUC". LG Electronics, Joint Video Exploration Team (JVET) of ITU-T SG 16 WP 3 and ISO/IEC JTC 1/SC 29/WG 11, JVET-G0065, Jul. 13-21, 2017 (9 pages).
International Preliminary Report on Patentability for PCT/US2019/015449 dated Aug. 4, 2020, (7 pages).
Chen, Jianle, et al., "Algorithm Description of Joint Exploration Test Model 6 (JEM6)". Joint Video Exploration Team (JVET) of ITU-T SG 16 WP 3 and ISO/IEC JTC 1/SC 29/WG 11, JVET-F1001-v3, Mar. 31-Apr. 7, 2017 (51 pages).

* cited by examiner

FRAME-RATE UP CONVERSION WITH LOW COMPLEXITY

CROSS-REFERENCE TO RELATED APPLICATIONS

The present application is a national stage application under 35 U.S.C. 371 of International Application No. PCT/US2019/015449, entitled "FRAME-RATE UP CONVERSION WITH LOW COMPLEXITY", filed on PCT Jan. 28, 2019, which claims benefit under 35 U.S.C. § 119(e) from U.S. Provisional Patent Application Ser. No. 62/623,143 entitled "FRAME-RATE UP CONVERSION WITH LOW COMPLEXITY," filed Jan. 29, 2018, which is hereby incorporated by reference in its entirety.

BACKGROUND

Video coding systems are widely used to compress digital video signals to reduce the storage need and/or transmission bandwidth of such signals. Among the various types of video coding systems, such as block-based, wavelet-based, and object-based systems, nowadays block-based hybrid video coding systems are the most widely used and deployed. Examples of block-based video coding systems include international video coding standards such as the MPEG1/2/4 part 2, H.264/MPEG-4 part 10 AVC, VC-1, and the latest video coding standard called High Efficiency Video Coding (HEVC), which was developed by JCT-VC (Joint Collaborative Team on Video Coding) of ITU-T/SG16/Q.6/VCEG and ISO/IEC/MPEG.

The first version of the HEVC standard, which was finalized in October, 2013, offers approximately 50% bit-rate saving or equivalent perceptual quality compared to the prior generation video coding standard H.264/MPEG AVC. Although the HEVC standard provides significant coding improvements over its predecessor, there is evidence that superior coding efficiency can be achieved with additional coding tools over HEVC. Based on that, both VCEG and MPEG started the exploration work of new coding technologies for future video coding standardization. In October 2015, ITU-T VECG and ISO/IEC MPEG formed the Joint Video Exploration Team (JVET) to begin significant study of advanced technologies that could enable substantial enhancement of coding efficiency over HEVC. In the same month, a software codebase, called Joint Exploration Model (JEM) was established for future video coding exploration work. The JEM reference software was based on the HEVC Test Model (HM) that was developed by JCT-VC for HEVC. Any additional proposed coding tools can preferably be integrated into the JEM software and tested using JVET common test conditions (CTCs).

SUMMARY

Exemplary embodiments include methods that are used in video encoding and decoding (collectively "coding"). In one example, a method is provided for coding a video comprising a plurality of pictures including a current picture. For at least one current block in the current picture (which may be, for example, a coding unit or a sub-coding-unit block), a first set of motion vector candidates is identified for frame-rate up conversion (FRUC) prediction of the block. The first stet of motion vector candidates may be major motion vectors, where each major motion vector is associated with a cluster of one or more initial motion vectors. A search center is defined based on the first set of motion vector candidates. The search center may be at a position determined by an average of one or more of the motion vector candidates in the first set.

A search window is determined, the search window having a selected width and being centered on the search center. The first set of motion vector candidates are processed by clipping any motion vector in the first set that falls outside the search window so as to fall within the search window. A search for a selected motion vector may be performed, with the search selecting a motion vector from among the processed first set of motion vector candidates.

In some exemplary embodiments, the search window width is selected so as to allow the search to be performed using a memory cache while limiting a number of accesses to external memory.

A motion refinement search may be performed starting with the selected motion vector. In some embodiments, the search range of the refinement search is constrained to allow the refinement search to be performed using a memory cache and limiting the number of times main memory is accessed. In some embodiments, a number of search iterations is constrained to limit coding complexity.

In some embodiments, the first set of motion vector candidates is an initial set of candidates identified using advanced motion vector prediction or another technique. In some embodiments, a clustering algorithm is performed to cluster the initial set of motion vector candidates, and representative motion vector (e.g. a centroid) for each cluster is contributed to the first set. In some embodiments, the number of clusters is constrained to limit coding complexity.

The selected (and in some cases refined) motion vector may be used to predict the current block. In a method performed by an encoder, the prediction of the current block is compared with an input block, a residual is determined, and the residual is encoded in the bitstream. In a method performed by a decoder, a residual is decoded from the bitstream and added to the prediction to generate a reconstructed block, which may be displayed, possibly after filtering.

Disclosed embodiments further include encoders and decoders having a processor and a non-transitory computer-readable storage medium storing instructions operative to perform the methods described herein. Disclosed embodiments further include a non-transitory computer-readable storage medium storing a bitstream generated using any of the methods described herein.

BRIEF DESCRIPTION OF THE DRAWINGS

FIG. 10A illustrates majority-based selection, and FIG. 10B illustrates average-based selection.

DETAILED DESCRIPTION

Block-Based Video Coding.

Figure 1:
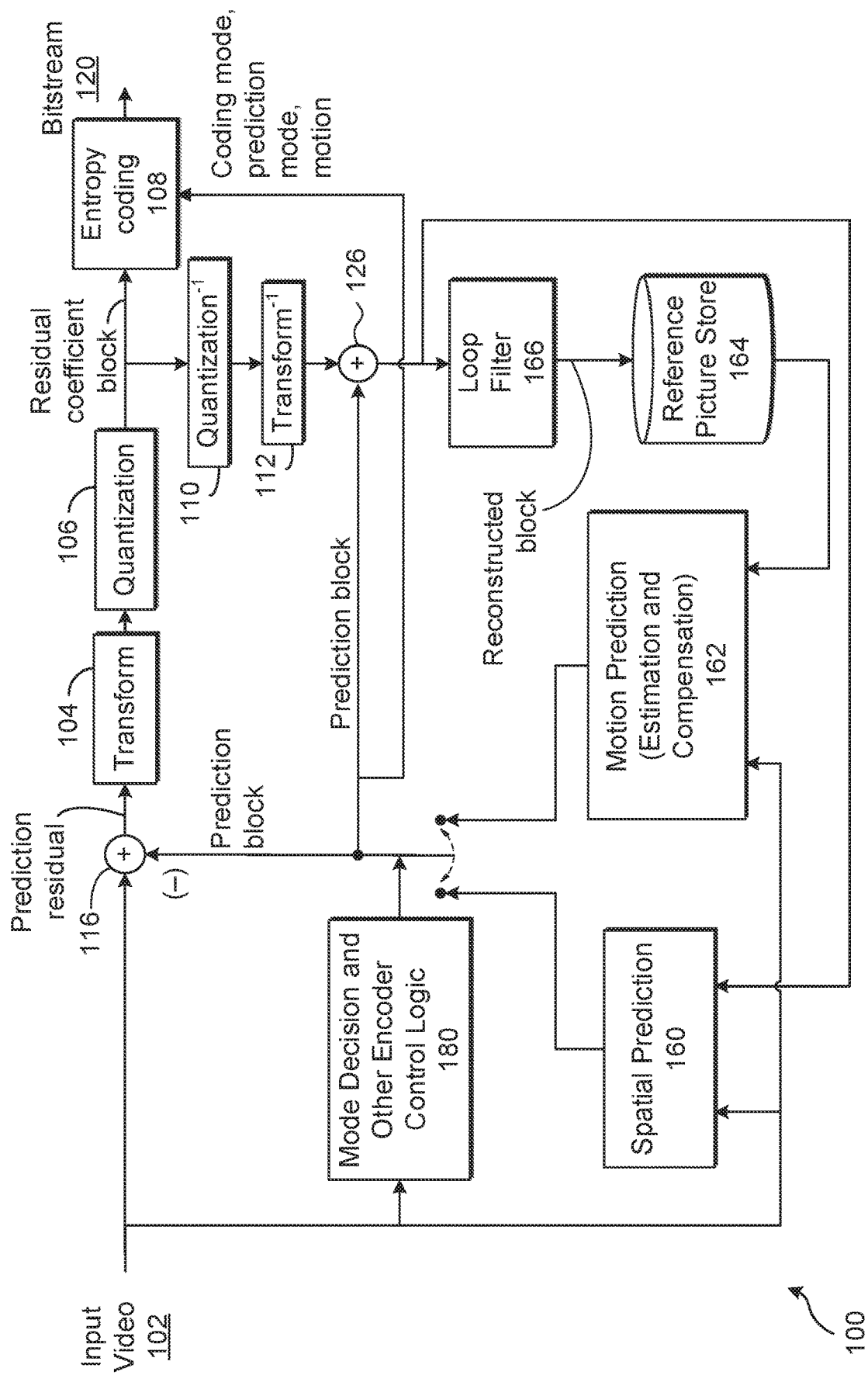
FIG. 1 is a functional block diagram of a block-based video encoder.

The HEVC Test Model (HM) and the Joint Exploration Model (JEM) software are both built upon the block-based hybrid video coding framework. FIG. 1 is a block diagram of a block-based hybrid video encoding system. The input video signal 102 is processed block by block. In HEVC, extended block sizes (called a coding unit (CU)) are used to efficiently compress high resolution (1080p and beyond) video signals. In HEVC, a CU can be up to 64×64 pixels. A CU can be further partitioned into prediction units (PU), for which separate prediction methods are applied. For each input video block (MB or CU), spatial prediction (160) and/or temporal prediction (162) may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given video block is usually signaled by one or more motion vectors (MVs) which indicate the amount and the direction of motion between the current block and its reference block. Also, if multiple reference pictures are supported (as is the case for the recent video coding standards such as H.264/AVC or HEVC), then for each video block, its reference picture index is sent additionally, and the reference index is used to identify from which reference picture in the reference picture store (164) the temporal prediction signal comes. After spatial and/or temporal prediction, the mode decision block (180) in the encoder chooses the best prediction mode, for example based on the rate-distortion optimization method. The prediction block is then subtracted from the current video block (116), and the prediction residual is de-correlated using transform (104) and quantization (106). The quantized residual coefficients are inverse quantized (110) and inverse transformed (112) to form the reconstructed residual, which is then added back to the prediction block (126) to form the reconstructed video block. Further in-loop filtering such as de-blocking filter and Adaptive Loop Filters may be applied (166) on the reconstructed video block before it is put in the reference picture store (164) and used to code future video blocks. To form the output video bit-stream 120, coding mode (inter or intra), prediction mode information, motion information, and quantized residual coefficients are all sent to the entropy coding unit (108) to be further compressed and packed to form the bit-stream.

Figure 2:
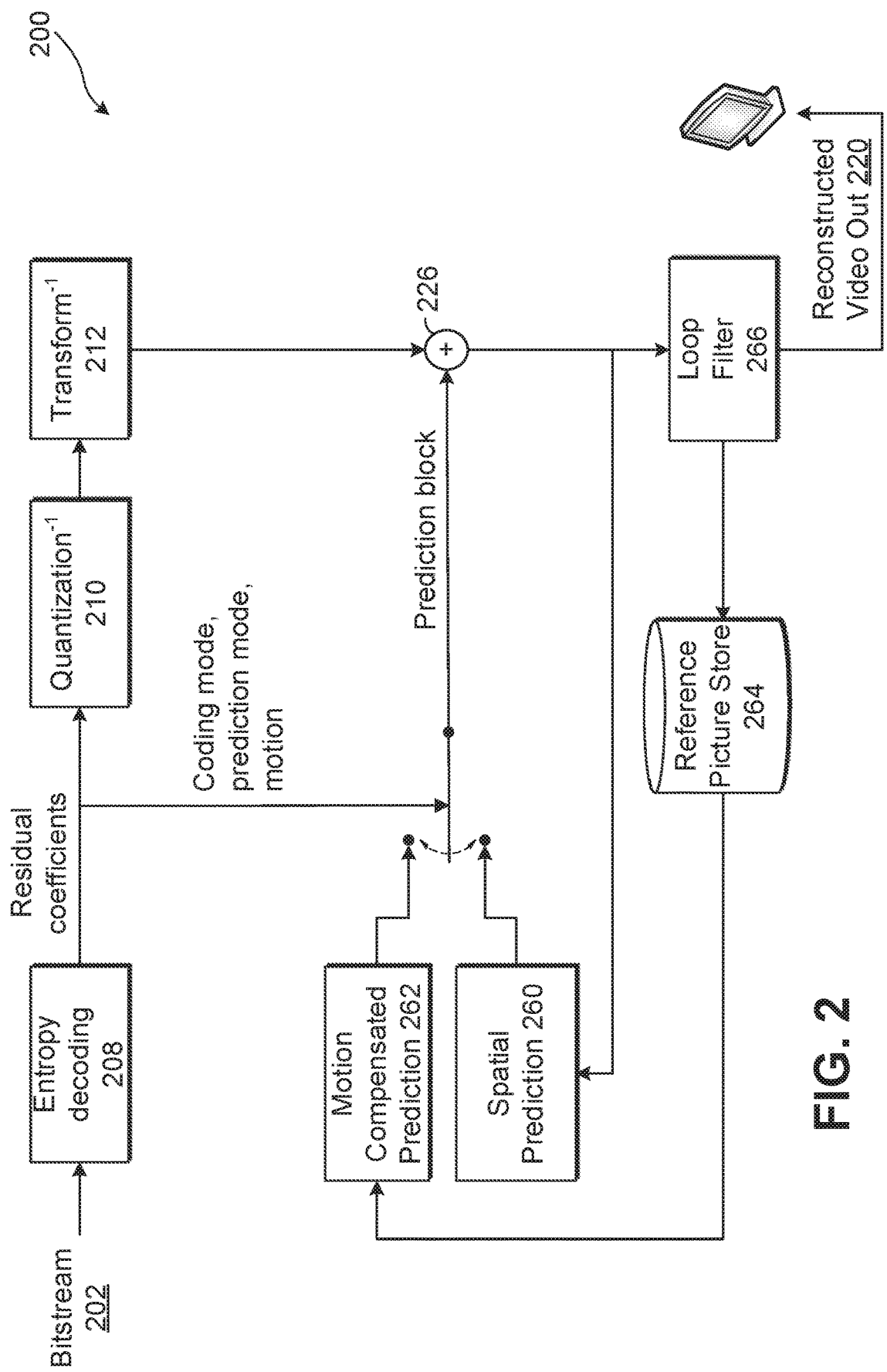
FIG. 2 is a functional block diagram of a video decoder.

FIG. 2 is a block diagram of a block-based video decoder. The video bit-stream 202 is first unpacked and entropy decoded at entropy decoding unit 208. The coding mode and prediction information are sent to either the spatial prediction unit 260 (if intra coded) or the temporal prediction unit 262 (if inter coded) to form the prediction block. The residual transform coefficients are sent to inverse quantization unit 210 and inverse transform unit 212 to reconstruct the residual block. The prediction block and the residual block are then added together at 226. The reconstructed block may further go through in-loop filtering before it is stored in reference picture store 264. The reconstructed video in reference picture store is then sent out to drive a display device, as well as used to predict future video blocks.

Figure 3A:
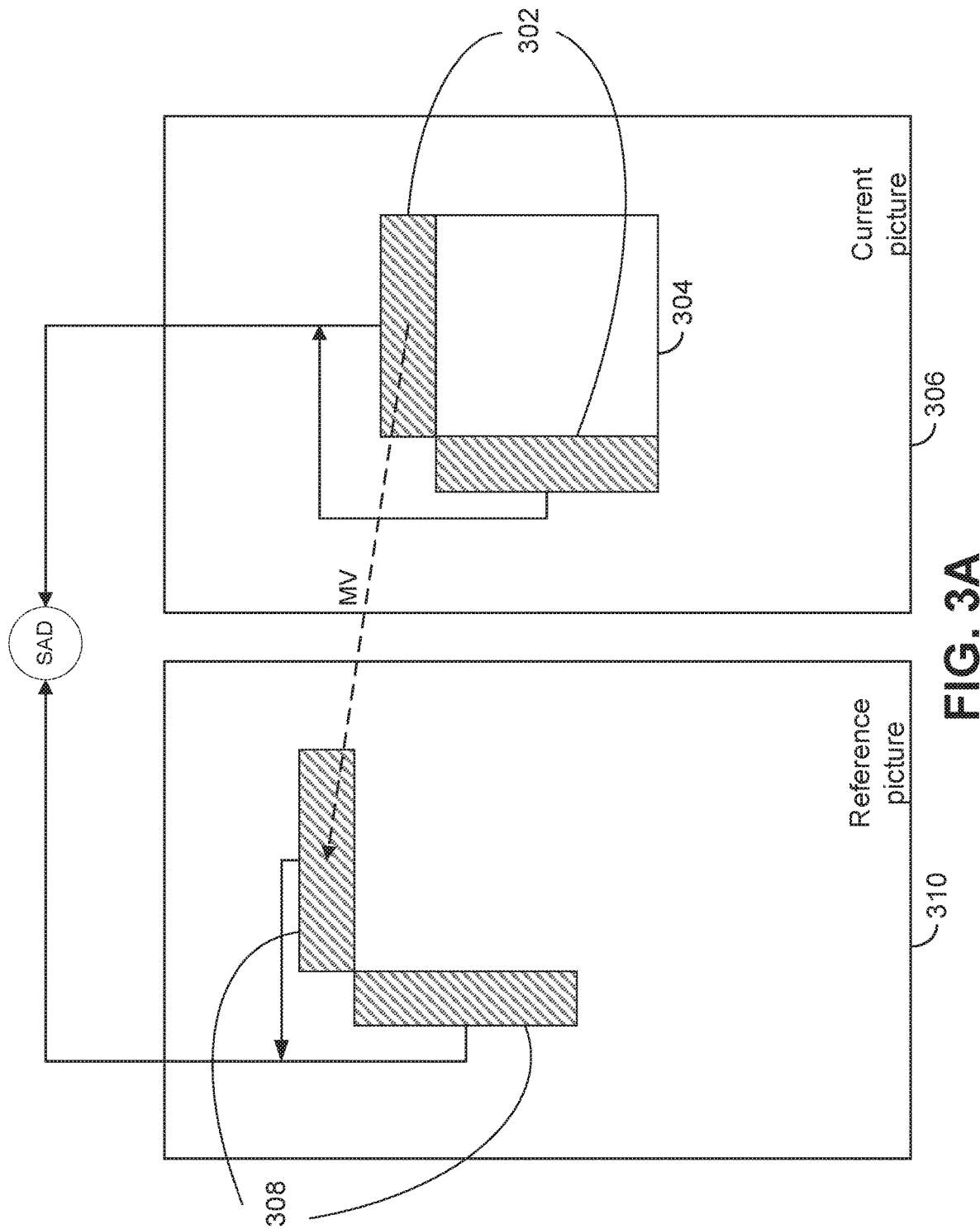
FIGS. 3A-3B illustrate frame-rate up conversion (FRUC) using template matching (FIG. 3A) and bilateral matching (FIG. 3B).
Figure 3B:
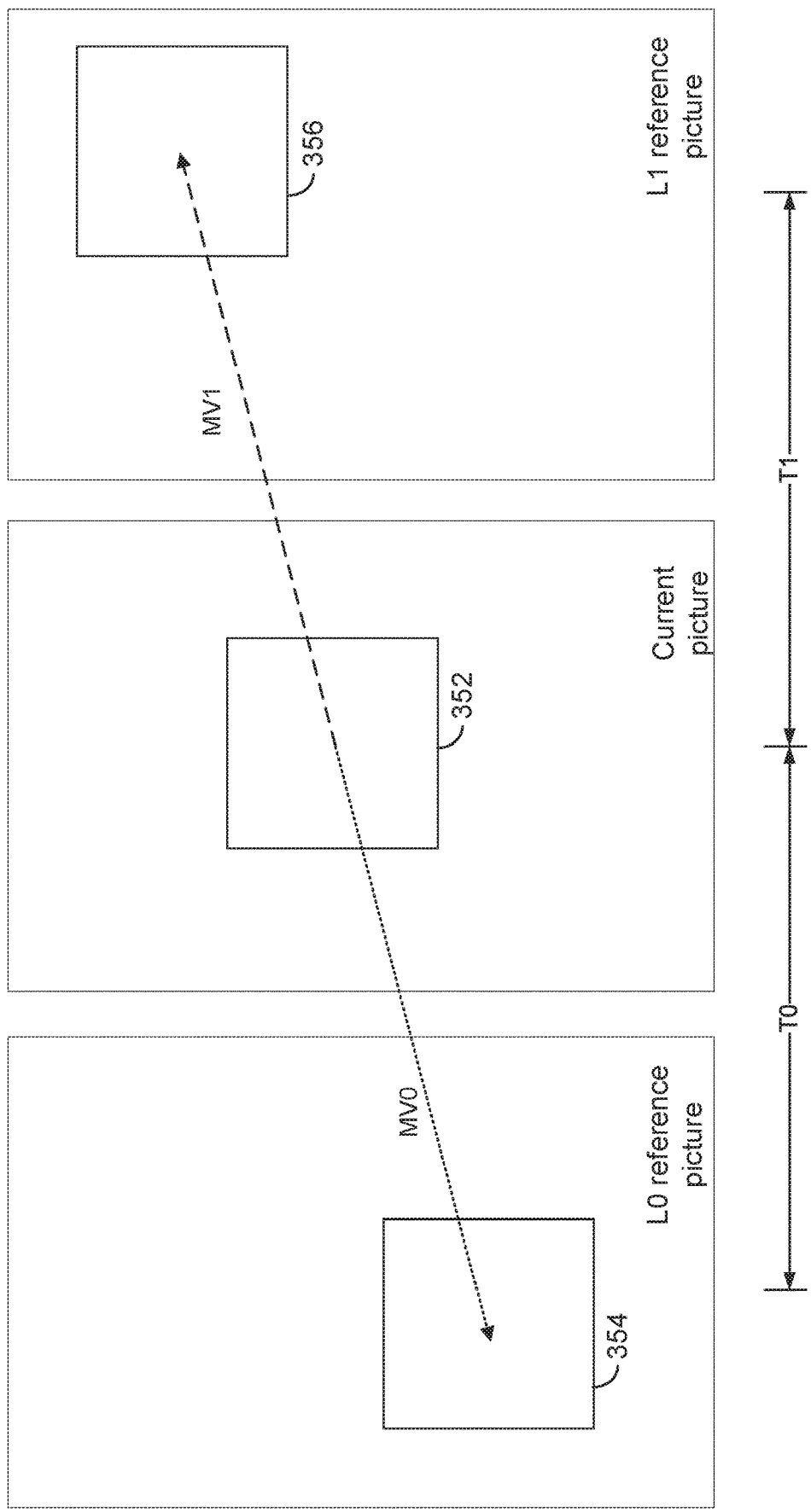

In HEVC, motion information (including MVs and reference picture indices) is determined by the encoder and explicitly transmitted to the decoder. Therefore, for inter-coded blocks, a significant amount of overhead is spent on the coding of the motion parameters. To save the overhead of signaling motion information, a coding mode called frame-rate up conversion (FRUC) is supported for inter coding in the current JEM. When this mode is enabled for a CU, both the MVs and the reference picture indices are not signaled; instead, the information is derived at the decoder side by either template-matching or bilateral-matching techniques. FIGS. 3A-3B illustrate an MV derivation process used in FRUC. In the example of FIG. 3A, template-matching is used to derive the MV of the current CU by finding the best match between a template 302 (top and/or left neighboring samples) of the current CU 304 in the current picture 306 and a template 308 of the reference block in a reference picture 310. The best match may be selected as the MV that achieves the lowest matching cost, for example, the lowest Sum of Absolute Difference (SAD), between the current template and the reference template. In FIG. 3B, the bilateral-matching is used to derive motion information of the current block 352 by finding the best match between two blocks 354, 356 along the motion trajectory of the current block in two different reference pictures. The motion search process of bilateral-matching is based on motion trajectory, such that the motion vectors $MV_0$ and $MV_1$ pointing to the two reference blocks 354, 354, respectively, shall be proportional to the temporal distances between the current picture and each of the two reference pictures (To and Ti). To decide on the pair of motion vectors $MV_0$ and $MV_1$ used in bilateral FRUC mode, motion vector candidates are examined. For each candidate, motion search is performed using list-0 motion vectors and list-1 motion vectors separately, the pair of motion vectors with the lowest matching cost (e.g. SAD) is selected. The decision on whether to use the template-matching mode or bilateral-matching mode is based on rate-distortion (R-D) cost optimization. The mode leading to the minimal rate-distortion cost is selected as the FRUC mode for the current CU.

The motion derivation processes of both the template-matching mode and the bilateral-matching mode include four steps: CU-level motion search, CU-level motion refinement, sub-CU-level motion search and sub-CU-level motion refinement. At CU-level motion search, an initial motion (including the MVs and the reference picture indices) is derived for the whole CU based on either template-matching or bilateral-matching. Specifically, a list of MV candidates is firstly generated, and the candidate which leads to the minimum matching cost is selected as the starting MV for the CU. Then, at the CU-level motion refinement stage, a local search based on template-matching or bilateral-matching around the starting point is performed and the MV with the minimum matching cost is taken as the MV for the whole CU.

Figure 4:
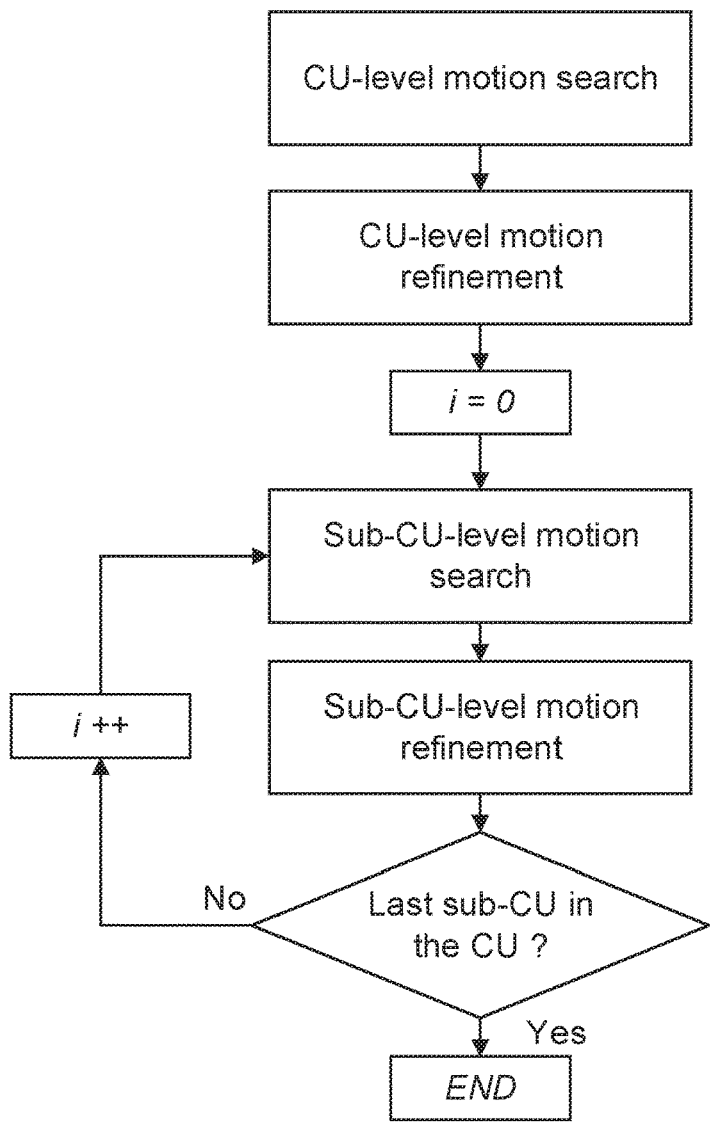
FIG. 4 is a flowchart of a motion derivation process for FRUC in an implementation of JEM.

Subsequently, both the granularity and accuracy of the motion information are further refined at the sub-CU-level motion search stage and the sub-CU-level motion refinement stage by dividing the current CU into multiple sub-CUs and deriving the motion information of each sub-CU with the MV derived from the CU-level as the starting search point. FIG. 4 is a flowchart of the motion derivation process of the FRUC mode in the current JEM.

Frame-Rate Up Conversion.

CU-Level Motion Search.

Figure 5:
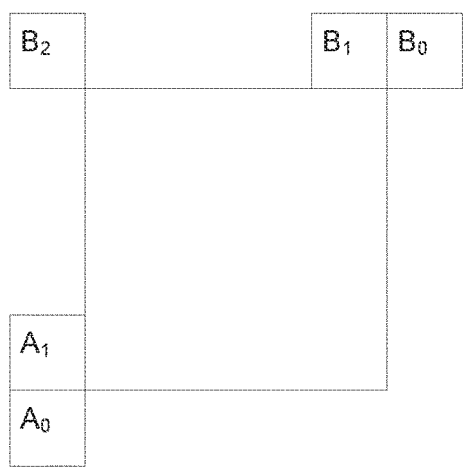
FIG. 5 is an illustration of positions of spatial motion vector candidates in merge mode.

At the CU-level motion search, a candidate-based searching method is applied to derive the initial MV of the current CU. It works by selecting a set of unique MV candidates for which the cost measurement of template-matching or bilateral-matching (depending on the FRUC mode that is applied to the current CU) is calculated; the MV candidate that minimizes the cost is selected as the initial MV of the whole CU. Specifically, the MV candidates as discussed below are evaluated at the CU-level motion search:

1) The MV predictors that are derived from advanced motion vector prediction (AMVP) in JEM when the FRUC is applied to predict the MV(s) of the current CU in the AMVP mode;
2) The MVs of the regular merge candidates, including the five spatial candidates A1, B1, B0, A0 and B2 (as depicted in FIG. 5), and the temporal candidate derived from the MV of the collocated block in the temporal neighboring picture by temporal motion vector prediction (TMVP);
3) Four interpolated MVs at the position (0, 0), (W/2, 0), (0, H/2) and (W/2, H/2) generated by picture-level MV field interpolation process as described in the section "Picture-level MV Field Interpolation," where W and H are the width and height of the current CU; and
4) The MVs of the top and left neighbors of the current CU.

Additionally, a pruning operation is performed when generating the MV candidate list at the CU-level such that the MV candidate will not be added into the MV candidate list if it is redundant (i.e., if the MV candidate has the same motion as that of an existing MV candidate in the list). Such techniques for candidate list generation may be used in steps 904, 1204, and 1304 described below.

Moreover, when the bilateral-matching mode is applied, the MV of each valid candidate is used as the input to generate a MV pair based on the assumption that the two MVs are on the same motion trajectory of the current CU. For example, one valid MV is ($MV_a$, $ref_a$) at reference list a (a=0, 1). Then the reference picture $ref_b$ of its paired bilateral MV is found in the other reference list b such that $ref_a$ and $ref_b$ are temporally symmetric to the current picture. If there is no such reference picture $ref_b$ in reference list B that is symmetric to $ref_a$, $ref_b$ is determined by selecting a reference picture which is different from $ref_a$ and its temporal distance to the current picture is minimized in list B. After $ref_b$ is determined, $MV_b$ is derived by scaling $MV_a$ per temporal distances between the current picture and $ref_a$ and $ref_b$, as follows, $$\frac{MV_a^x}{MV_b^x} = \frac{MV_a^y}{MV_b^y} = \frac{\tau_a}{\tau_b} \qquad \text{Eq. 1}$$

where ($MV_a^x$, $MV_a^y$) and ($MV_b^x$, $MV_b^y$) are horizontal and vertical motion components of $MV_a$ and $MV_b$; $\tau_a$ and $\tau_b$ are the temporal distances of the reference pictures $ref_a$ and $ref_b$ to the current picture. Based on the existing design, up to 15 MVs can be included at the CU-level motion search stage.

Sub-CU-level Motion Search.

At the CU-level motion search, the corresponding MV is derived at the CU-level (the derived MV is used to represent the motion of the whole CU). However, such granularity may be not good enough given that the current CU may cover the areas corresponding to different objects that are associated with distinct motions. Therefore, to improve the precision of the derived MVs, each CU that is coded by the FRUC mode (either template-matching or bilateral-matching) is further split into M×M sub-CUs and the individual MV for each sub-CU is derived separately. The value of M is calculated as in Eq. 2, where D is a predefined splitting depth constraint which is set to 3 in the JEM.

$$M = \max\left(4, \min\left(\frac{W}{2^D}, \frac{H}{2^D}\right)\right) \qquad \text{Eq. 2}$$

Additionally, similar to the CU-level motion search, the MV of each sub-CU is derived by firstly generating a list of MV candidates and selecting the MV candidate which minimizes the matching cost as the MV of the sub-CU. In some embodiments, the MV candidate list at the sub-CU level includes 1) The MV determined at the CU-level motion search;

2) The MVs from the top, left, top-left and top-right spatial neighboring CUs;
3) Scaled version of collated MVs from temporal reference pictures;
4) Up to 4 MVs obtained from the candidates derived by advanced temporal motion vector prediction (ATMVP); and
5) Up to 4 MVs obtained from the candidates derived by spatial-temporal motion vector prediction (STMVP).

Additionally, during the sub-CU motion search, a specific MV candidate can be included into the MV candidate list only if the MV candidate points to the same reference picture as indicated by the starting CU-level MV; otherwise, the MV candidate will be excluded from matching cost calculation. This could reduce the memory bandwidth consumption when implementing the FRUC in hardware, because the MVs of all the sub-CUs inside the CU are pointing to the same reference pictures (the reference pictures that are associated with the starting CU-level MV). Therefore, only those reference pictures are be accessed for finding the optimal MVs at the sub-CU-level. Based on the existing design, up to 17 MVs can be included at the sub-CU-level motion search stage. Such techniques for sub-CU-level MV candidate list generation may be used in steps 918, 1218, and 1318 described below.

Picture-Level MV Field Interpolation.

Figure 6:
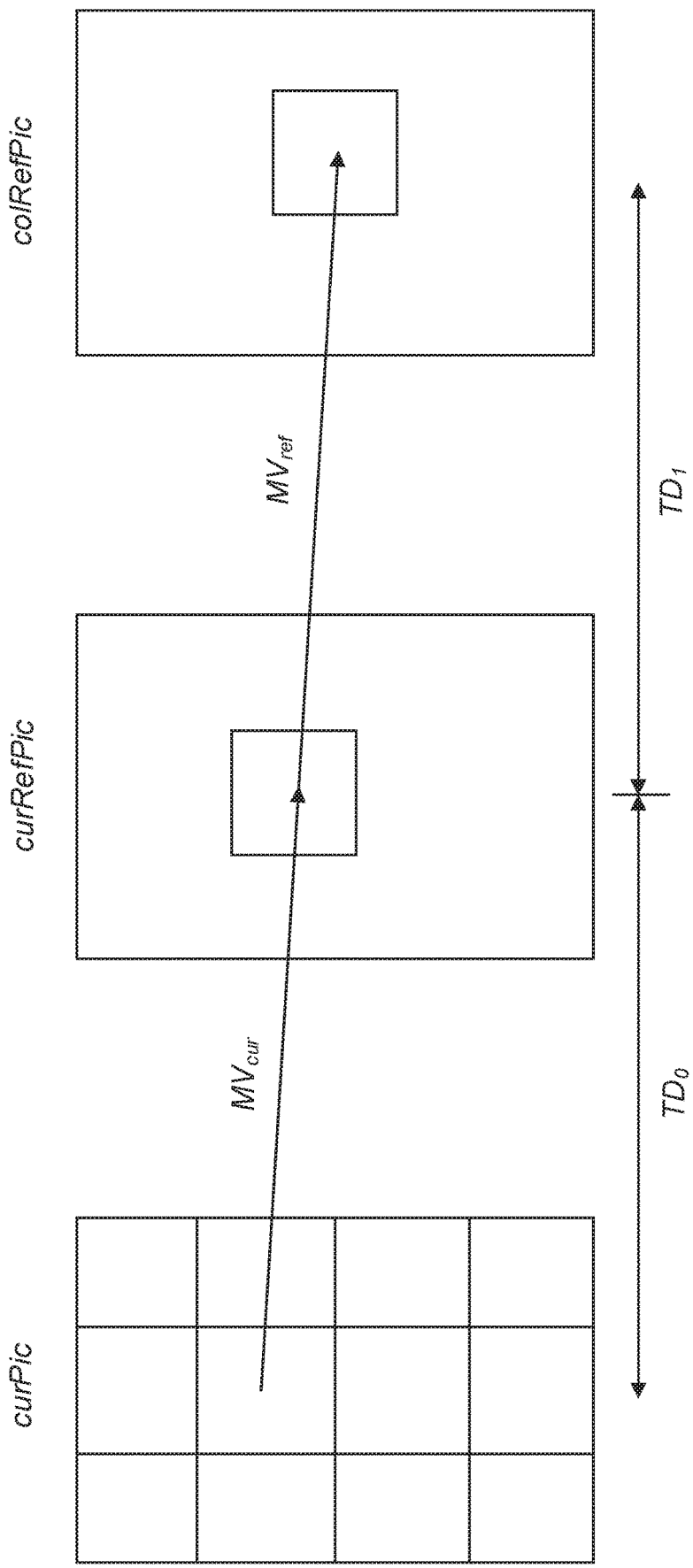
FIG. 6 is an illustration of motion field interpolation used in FRUC.

When the FRUC is enabled, before each inter picture is coded, an interpolated motion field is generated for all the 4×4 blocks in the picture based on unilateral MV projection. Then, the interpolated MVs will be used to search the optimal MV at the CU-level motion search. FIG. 6 illustrates the process of generating the interpolated MVs in the current picture. Specifically, the motion field of each reference picture (curRefPic) in both reference picture lists of the current picture (curPic) is examined at 4×4 block level. For each 4×4 block in the reference picture, if its MV passes through a 4×4 block in the current block and the 4×4 block has not been assigned with an interpolated MV, the MV of the 4×4 reference block will scaled to the current picture according to the ratio between the temporal distance between the current picture and the reference picture ($TD_0$), and the temporal distance between the reference picture and its own reference picture (MI). And, the scaled MV will be assigned to the 4×4 block in the current picture. If there no scaled MV assigned to a 4×4 block, motion for that block will be marked as unavailable in the interpolated motion field.

CU-Level and Sub-CU-Level Motion Refinement.

Due to the limited number of search candidates, the MVs derived from the CU-level motion search and the sub-CU-level motion search may not be always accurate enough to represent the true motion of the current CU, therefore may impair the efficiency of motion compensated prediction. To further improve the precision of the derived MVs, MV refinement processes are further applied after the CU-level motion search and the sub-CU-level motion search. The MV refinement is a pattern-based local MV search process by minimizing the cost measurement of template-matching or bilateral-matching. Specifically, two search patterns are supported in the current JEM: diamond search pattern at the CU-level motion refinement and cross search pattern at the sub-CU-level motion refinement, respectively. For both the CU-level motion refinement and the sub-CU-level motion refinement, the MV search is firstly performed at the quarter-sample accuracy followed by an additional local motion refinement (around the best quarter-sample MV) at one-eighth-sample accuracy. Additionally, when an MV points to a fractional sample position, instead of using the 8-tap interpolation filter in HEVC, a bi-linear interpolation filter is used for both template-matching and bilateral-matching modes for reduced encoding/decoding complexity. Moreover, it should be mentioned that in both the CU-level motion refinement and the sub-CU-level motion refinement, the search process is unrestricted in the sense that the refinement search will be repeated until the search center is not updated in a predefined search range (which is set equal to 8 integer luma sample in the current JEM).

FRUC CU/Sub-CU Motion Search Based on MV Clustering.

As described above, at both the CU-level motion search and the sub-CU-level motion search in the existing FRUC, the best MV is selected from a set of unique MV candidates. For example, there are up to 15 and 17 MV candidates that need to be examined at the CU-level motion search and the sub-CU-level motion search, respectively. This introduces significant complexity increase at both encoder and decoder, as the motion compensated prediction is performed multiple times to generate the prediction signal for each MV candidate. Moreover, such a candidate-based searching process significantly increases the memory bandwidth for hardware implementation due to fetching reference samples from temporal reference pictures for calculating the cost measurement. Such memory bandwidth issue may become more critical for the CU-level motion search where the MV candidates can come from different reference pictures. Therefore, the encoder/decoder would frequently switch the memory access to different reference pictures. This could potentially increase the possibility of cache reading miss and therefore lead to significant increase of external memory access.

To reduce the complexity and improve the memory bandwidth usage, an MV clustering method has been proposed for the motion search processes at both the CU-level and the sub-CU-level. Specifically, the proposed method includes three steps: 1) reference picture selection, 2) MV scaling and pruning and 3) MV clustering.

Reference Picture Selection.

To avoid frequently switching the memory access to multiple reference pictures, in MV clustering based motion search, a single reference picture is selected for a given reference picture list at the CU-level and sub-CU-level motion search. To select the reference picture, the majority rule is applied to select the reference picture index for a given reference picture list which has been used most frequently by the MV candidates in the candidate list. More specifically, it is assumed that there are K MV candidates and M reference pictures in the reference picture list LX (X=0, 1). Further, assuming the K MV candidates are associated with a collection of reference pictures with the indices $r_0, r_1, \ldots, r_{K-1}$ in the LX, where $r_i \in [0, M-1]$, the selected reference picture index is determined as $$r^* = \underset{n \in [0, M-1]}{\operatorname{argmax}} \sum_{i=0}^{K-1} 1_n(r_i) \qquad \text{Eq. 3}$$

where $1_n(r_i)$ is the indicator function as defined as $$1_n(r_i) = \begin{cases} 1, & r_i = n \\ 0, & r_i \neq n \end{cases} \qquad \text{Eq. 4}$$

Additionally, because the above reference picture selection method is used to determine an optimal reference picture index for a given reference picture list (i.e., L0 or L1), they can be directly applied to unilateral-based motion derivation (e.g., template-matching mode) where the MVs in L0 and L1 are derived independently. When the bilateral-matching mode is applied, the MVs are derived in pairs based on the assumption that the two MVs are on the same motion trajectory of the current block. Therefore, when applying the proposed reference picture selection methods for the bilateral-matching mode, additional constraint may also be applied to ensure that the selected reference pictures in L0 and L1 satisfy the conditions to enable the bilateral-matching (two reference pictures are temporally symmetric to the current picture or the temporal distance to the current picture is minimized in a reference picture list). Such reference picture selection methods may be used in steps 906, 1206, and 1306 described below.

MV Scaling and Pruning

After the reference picture index is determined, the MV candidate list is updated by scaling the intial MV candidates to the same reference picture as indicated by the selected reference picture index. Without loss of generality, the reference picture list L0 is used as example to illustrate the MV scaling process. For instance, given the i-th MV candidate $MV_i$, if its original L0 reference picture index (i.e., $r_{L0}^i$) is equal to the selected L0 reference picture index $r^*_{L0}$, then the updated MV candidate $MV_i'$ is directly set to be $MV_i$; otherwise ($r_{L0}^i$ is not equal to $r^*_{L0}$), $MV_i'$ is set to be the scaled version of $MV_i$, as calculated as $$MV_i' = MV_i \cdot \frac{\tau^*}{\tau_i} \quad \text{Eq. 5}$$

where $\tau_i$ is the temporal distance between the reference picture indicated by $r_{L0}^i$ and the current picture; $\tau^*$ is the temporal distance between the reference picture indicated by $r^*_{L0}$ and the current picture. Additionally, because the values of different MV candidates may become the exact same value after the MV scaling operation (for example, due to precision loss), pruning is performed to remove any duplicated entries such that only unique MV candidates are maintained in the final list.

MV Clustering.

To further reduce the complexity of the initial motion search, an MV clustering method is used to reduce the total number of the MV candidates for which the cost measurement is calculated at both the CU-level motion search and the sub-CU-level motion search. In general, the MV clustering method aims at dividing the MVs in the candidate list into L groups such that the average distance of all the MV candidates that fall into the same group can be minimized, where L is number of MV elements in the final candidate list. Denote the MVs in the MV candidate list after reference picture selection and MV scaling/pruning as $\{MV_0', MV_1', MV_{N-1}'\}$, where N is total number of elements in the MV candidate list. The target of the proposed MV clustering method is to partition the N MVs to L (L≤N) groups $S=\{S_0, S_1, \ldots, S_{L-1}\}$ so as to minimize the within-cluster distance, as formulated as $$\arg\min_S \sum_{i=0}^{L-1} \Sigma_{MV_j' \in S_i} \|MV_j' - \mu_i\| \quad \text{Eq. 6}$$

where $\mu_i$ is the centroid of $S_i$. To solve the clustering optimization problem in Eq. 6, the classical k-means refinement algorithm (which is also referred to as Lloyd's algorithm) may be adapted to cluster the MVs in the initial candidate list. Specifically, the algorithm proceeds by repeating the following two steps in an alternative way when going through all the MV candidates.

1) Assignment step: calculate the distance of an MV candidate to the centroid of each MV cluster and find the cluster which yields the least distance. If the best distance is smaller than a pre-defined distance threshold, then the MV candidate is added into the cluster; otherwise, a new cluster is created and add the MV candidate into the new cluster.
2) Update step: when a new MV candidate is added into a cluster, update the new means to be the centroid of all the MV candidates (including the newly added one) in the cluster, as indicated as $$\mu_i^{(t+1)} = \frac{1}{|S_i^{(t)}|} \cdot \sum_{MV_j' \in S_i^{(t)}} MV_j' \quad \text{Eq. 7}$$

where $|S_i^{(t)}|$ represents the number of the elements in the MV group $S_i$ at the t-th clustering iteration; $\mu_i^{(t+1)}$ is the updated centroid of $S_i$.

Given the derived MV clusters, the centroid MVs of the resulting clusters may be used as the final MV candidates for comparing the cost measurements to derive the initial MV at the CU-level and the sub-CU-level. In some embodiments, the assignment step and update step are performed once for each of the initial MV candidates. In one such embodiment, the first motion vector candidate is initially set as the centroid of the first cluster. If the second motion vector candidate is less than a threshold distance from that first centroid, then the second motion vector candidate is added to the first cluster and the centroid of the first cluster is re-calculated; otherwise, a second cluster is generated with the second motion vector as its centroid. The process proceeds with each subsequent candidate motion vector either being assigned to the existing cluster with the nearest centroid (followed by updating of the centroid) or else being used to spawn a new cluster. The candidate MVs may be processed in a predetermined order to ensure that the process gives the same clustering results at the encoder and decoder sides. Such clustering methods may be used in steps 908, 920, 1208, 1220, 1308, and 1320 described below.

Additional details and alternative clustering methods may be implemented as described in U.S. Provisional Patent Application No. 62/599,238, entitled "Frame Rate Up Conversion with Reduced Complexity," filed 15 Dec. 2017.

Issues Addressed in Some Embodiments.

As described above, the clustering-based motion search groups the initial MV candidates into several sets and only determines one major MV (e.g. the MV centroid) for each MV group. In such way, the total number of the MV candidates to be tested for the cost measurement can be reduced. Although the MV clustering method can efficiently reduce the complexity of FRUC motion derivation (at both CU-level and sub-CU-level), several aspects in the existing FRUC design still make it difficult to be implemented in practical encoder/decoder hardware. Specifically, the following complexity issues in the current FRUC are identified in this disclosure.

Figure 7:
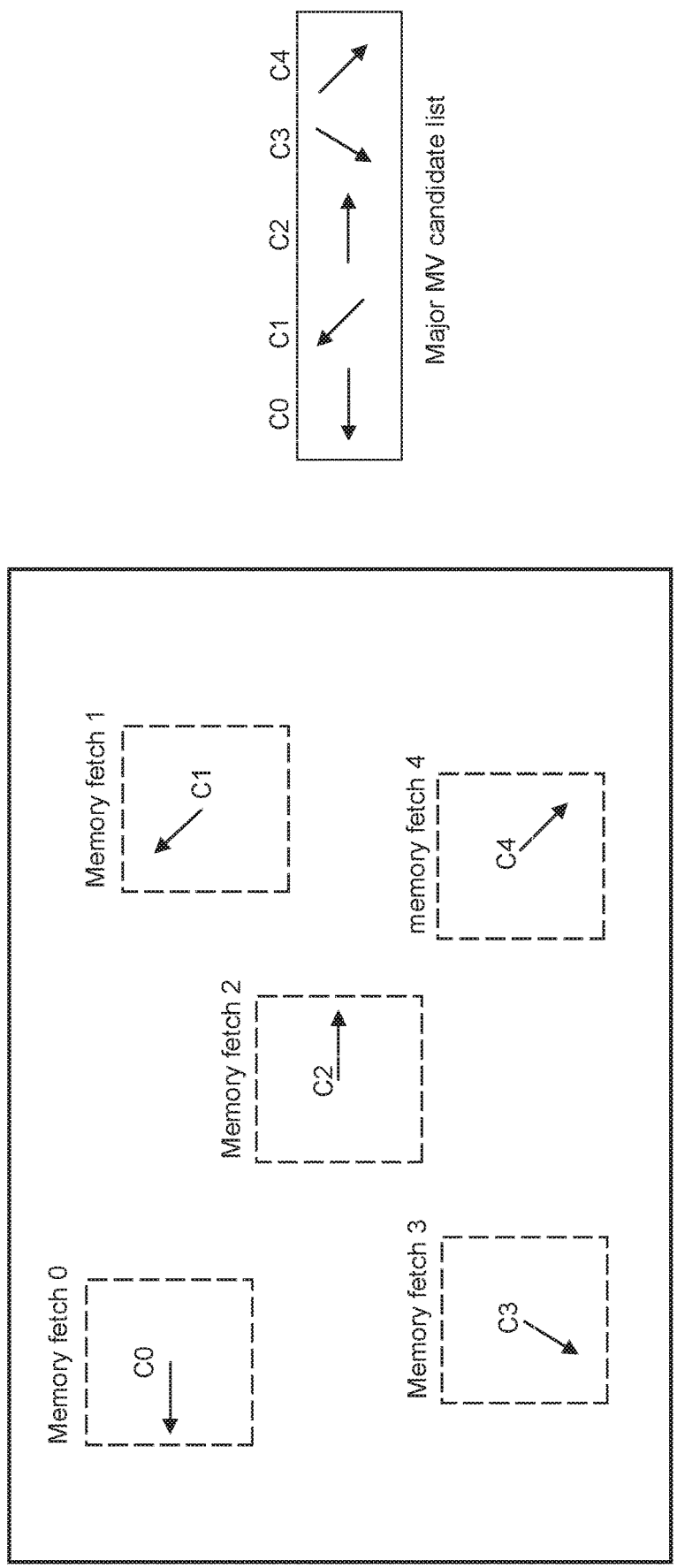
FIG. 7 illustrates an example of reference sample accesses after the MV clustering is applied for the FRUC.

One issue is that, at the beginning of the clustering-based motion search, reference picture selection is applied to determine the best reference picture for each reference picture list based on the reference picture indices of the MVs in the initial candidate list (either at CU-level or at sub-CU-level). Unlike an MV search method which calls for frequent switching the memory access to different reference pictures, the reference picture selection scales all the MV candidates to the selected reference picture (in both L0 and L1). Therefore, all the MV candidates that are forwarded to the MV clustering process are associated with the same reference picture. However, the MV clustering method groups the MVs in the initial candidate list by minimizing the within-cluster distance. Therefore, if the initial candidate list is composed of MVs with distinctive characteristics, there will be a lot of clusters generated and the centroids of those clusters may be far apart from each other. In such a case, the encoder/decoder frequently switches the memory access to different regions in the selected reference picture. This could potentially increase the possibility of cache reading miss and therefore lead to significant increase of external memory access. FIG. 7 shows one example to illustrate the memory access bandwidth problem after the MV clustering is applied to the FRUC CU-/sub-CU-level motion initial search. In the example of FIG. 7, there are in total 5 distinctive major MV candidates (the centroids of MV clusters) after the MV clustering. Due to the difference characteristics of those MV candidates, it performs 5 separate memory accesses to the selected reference picture for deriving the initial MV of the current CU/sub-CU. This could require significant memory bandwidth in the real encoder/decoder implementation.

Figure 8:
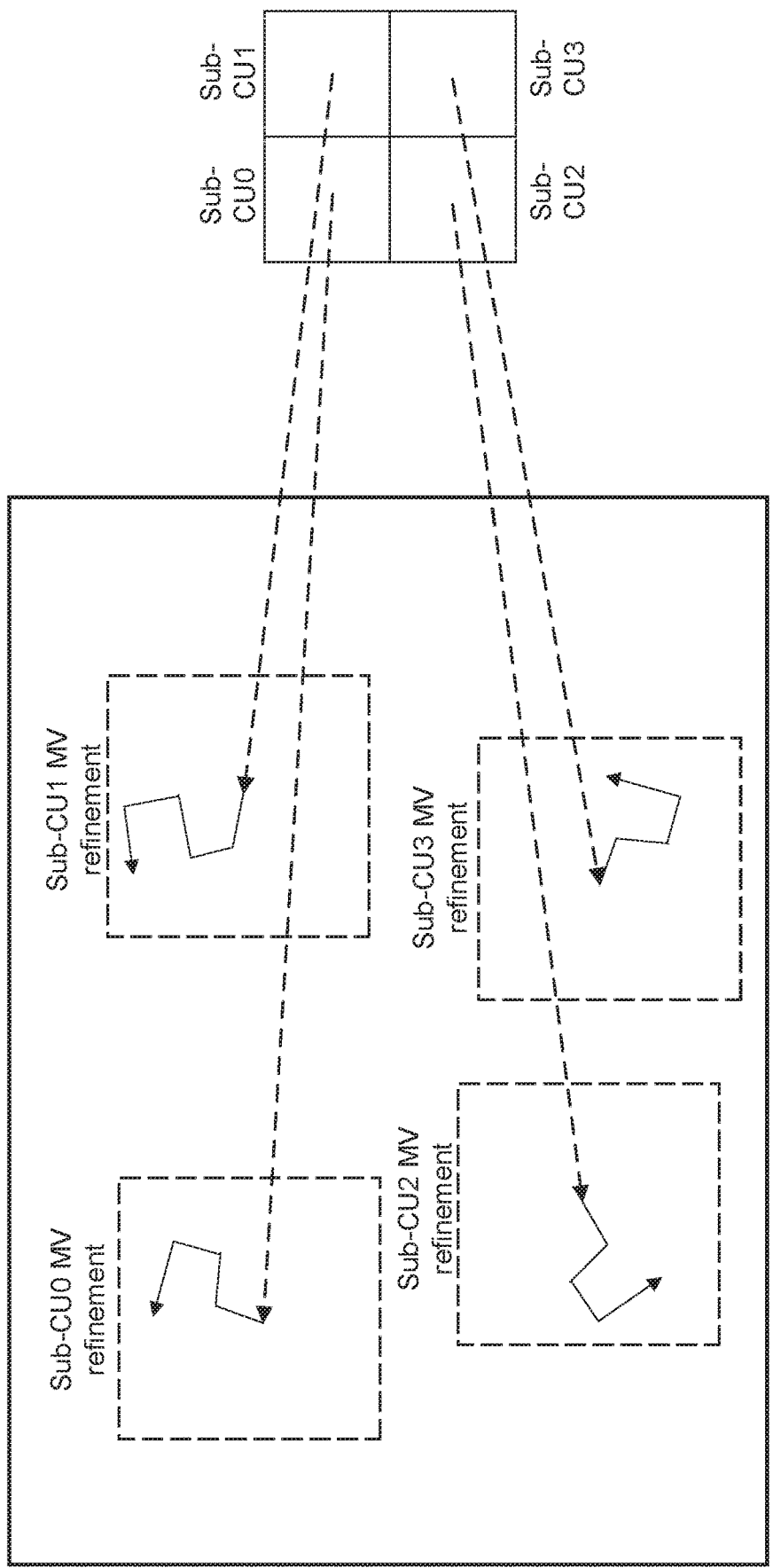
FIG. 8 is an illustration of memory access for a sub-CU-level motion search.

Another issue arises from the fact that, for each FRUC CU (either template-matching or bilateral-matching), it can further split into multiple sub-CUs, each of which can derive its own motion for improved MV precision. Additionally, the following MV refinement of each sub-CU is performed by using the MV determined at the sub-CU-level initial search as the starting point. Although the MV refinement of each sub-CU is limited to a predefined search window around the corresponding starting point (e.g., 8 integer luma sample), the search range of the whole sub-CU-level motion search is unrestricted since the initial MVs of the sub-CUs inside the CU are unbounded. FIG. 8 shows an example to illustrate the memory access process that is conducted at the sub-CU-level motion search stage, where the current CU is divided into 4 sub-CUs and dash squares enclose the corresponding local search window for each sub-CU (e.g., 8 integer luma sample from the starting MV). As it can be seen from FIG. 8 that after setting the respective search starting point of each sub-CU, it frequently switches (four different memory accesses in FIG. 8) accessing different areas in the reference picture. Such a design can also demand significant memory bandwidth usage in practice for encoder/decoder hardware.

A further issue relates to FRUC motion refinement (either CU-level motion refinement or sub-CU-level motion refinement), which is a local MV search process to improve the accuracy of the derived MVs by iteratively repeating a pattern-based motion search starting from the initial MV (e.g., diamond-shape search and cross-shape search). However, the maximum of the iterations that are conduced for the FRUC motion refinement is not specified in the existing design. In other words, the refinement process will continue unless the search center keeps unchanged in two consecutive search iterations. Based on the analysis of decoded bit-streams, statistics show that the number of searching iterations can be up to around 100 times. Such design is not friendly to practical hardware implementations, because there is no limit on the computational complexity of each FRUC CU. Given that FRUC uses the neighboring reconstructed samples to derive the motion information of the current block, such unconstrained motion search process will reduce the parallel processing capability and complicate pipeline design for real encoder/decoder hardware implementation.

To address these issues, various methods proposed in this disclosure operate to reduce both the average and the worst-case complexities of the FRUC. Various embodiments described herein include the following aspects. In some embodiments, methods are provided to constrain the search ranges for deriving the optimal MVs at various FRUC motion search stages. Exemplary methods can perform the FRUC-related motion search process in unified search regions such that the total number of the external memory access can be minimized. In some embodiments, restrictions are proposed to limit the maximum search iterations that are performed at the FRUC motion refinement process and to limit the total number of the major MV candidates that are generated by the MV clustering. Such embodiments are aimed at reducing worst-case complexity of the FRUC.

FRUC Motion Search with Constrained Search Range.

As pointed out above, multiple initial MV candidates can be generated at different FRUC motion search processes, e.g., the major MV candidates after the MV clustering and the initial MV of each sub-CU after the initial sub-CU-level motion search. Because those initial MVs may stand apart with large distances, multiple external memory access to the corresponding reference picture could be required to derive the optimal MV for the current CU/sub-CU. This could lead to significant memory bandwidth increase for a hardware codec implementation. To address such memory bandwidth problem, in the following, a constrained search range is proposed at different FRUC motion search stages such that all the reference samples that are needed for a given FRUC motion search can be obtained by one single access to the external memory.

Constrained Search Range for CU-Level Initial Motion Search.

Figure 9:
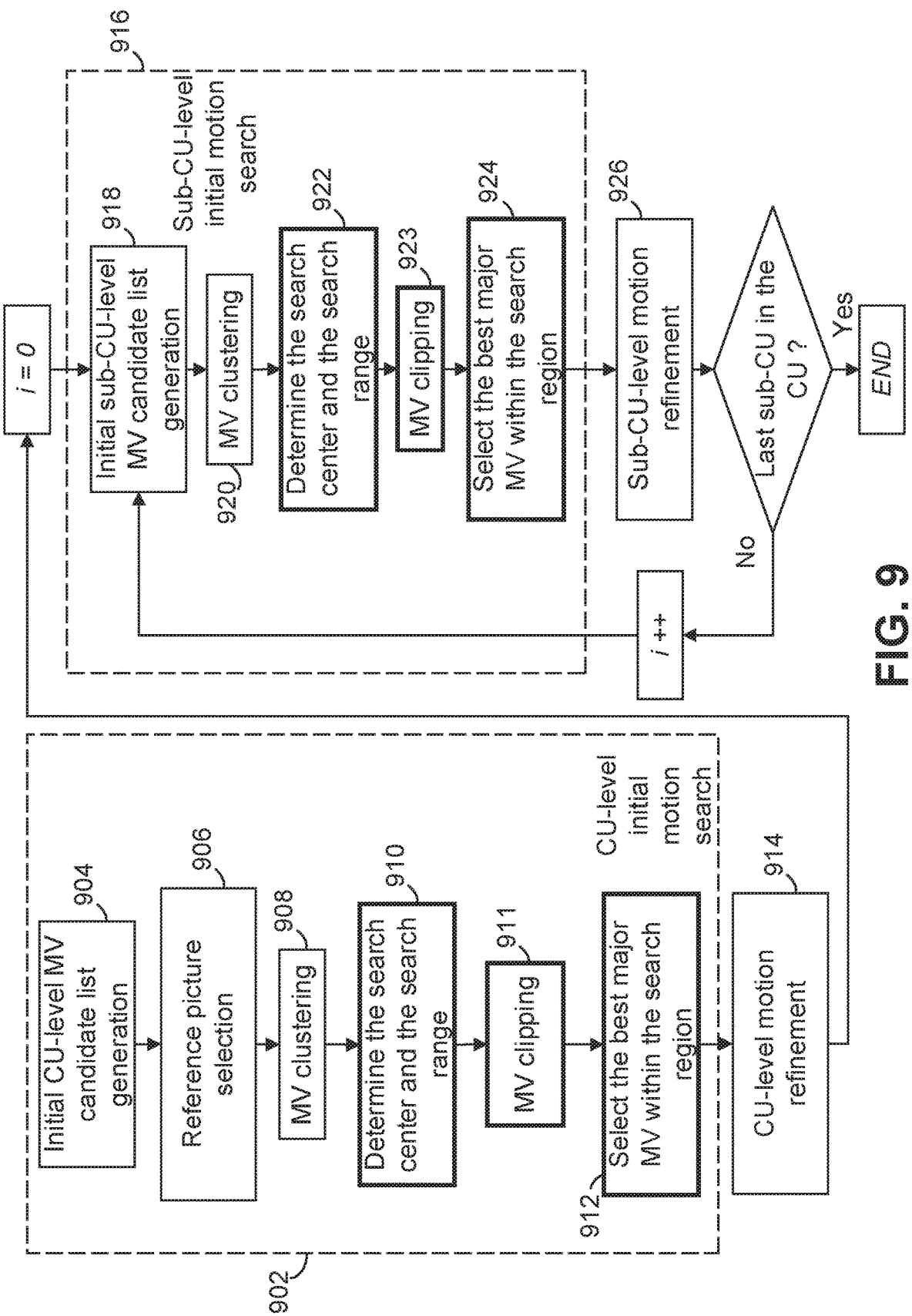
FIG. 9 is a flowchart of a FRUC motion search process with constrained search range for CU-level/sub-CU-level initial motion search according to some embodiments.

In some embodiments, a constrained search range used for the CU-/sub-CU-level initial motion search to reduce the memory bandwidth usage of the major MV candidates generated after the MV clustering. FIG. 9 illustrates the modified FRUC motion search process after the proposed constrained search range is applied to the CU-/Sub-CU-level initial motion search processes.

In FIG. 9, in a CU-level initial motion search (902), an initial CU-level MV candidate list is generated (904) and a reference picture is selected (906). The MVs in the MV candidate list are clustered (908), with a major MV representing each cluster. The major MV of a cluster may be the centroid of the MV candidates in the cluster. Based on the major MVs, the search center and the search range are determined (910). The major MVs are processed by clipping the major MVs (911) as appropriate such that they fall within the search range, and a search is performed to select the best processed major MV (912). CU-level motion refinement (914) is performed on the selected MV. After CU-level motion refinement, a sub-CU-level initial motion search (916) is performed. For each sub-CU in the CU, an initial sub-CU-level MV candidate list is generated (918) and the sub-CU-level MVs are clustered (920), each cluster being represented by a major MV. A search center and search range for the sub-CU-level initial motion search are determined (922), and the major MVs are processed by clipping (923) so as to fall within the sub-CU-level search range. A best processed major MV is selected within the search region (924), and sub-CU level motion refinement (926) is performed.

In greater detail, as shown in FIG. 9, after the major MV candidates (e.g. the centroids of MV clusters) are generated by the MV clustering (908), a search center is determined (910) for selecting the initial CU-/Sub-CU-level MV. To select the search center, in some embodiments, the majority rule is applied to select the centroid of the MV clusters which contains most initial MV candidates in the CU-/Sub-CU-level motion candidate list. Specifically, assuming there are K MV clusters ($C_0, C_1, \ldots, C_{K-1}$) which are generated from M MV candidates ($MV_0, MV_1, \ldots, MV_{M-1}$) in the initial MV candidate list, the selected search center is determined as $$SearchCenter = \text{Centroid}(C_{n^*}) \qquad \text{Eq. 8}$$

$$n^* = \underset{n \in [0, K-1]}{\arg\max} \sum_{i=0}^{M-1} 1_n(MV_i)$$

where $1_n(MV_i)$ is the indicator function as $$1_n(MV_i) = \begin{cases} 1, & MV_i \subseteq C_n \\ 0, & MV_i \not\subseteq C_n \end{cases} \quad \text{Eq. 9}$$

Figure 10A:
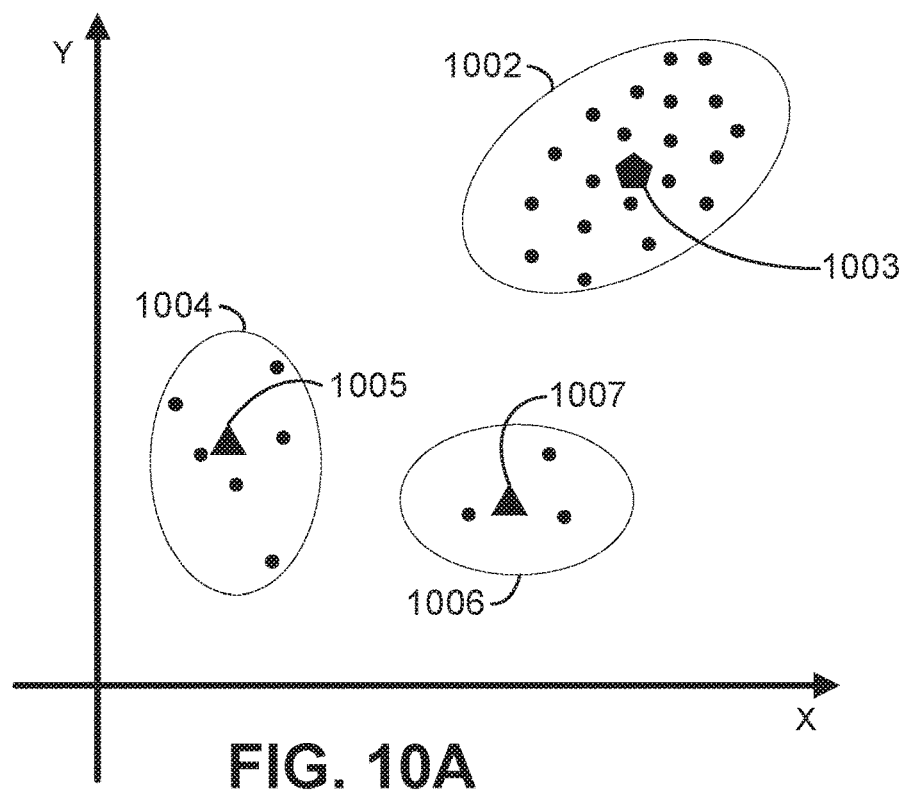
FIGS. 10A-10B illustrate examples of search center selection methods in some embodiments.

FIG. 10A shows one example to illustrate the above search center selection method. In FIG. 10A, there are in total 29 MV candidates (i.e., M=29) in the initial MV candidate list and they are classified into 3 MV clusters (i.e., K=3): clusters 1002, 1004, 1006. Moreover, in this example, the number of initial MV candidates covered by each MV cluster is 20 in the top cluster, 6 in the bottom-left cluster, and 3 in the bottom right cluster. The centroids of clusters 1002, 1004, and 1006 are indicated at 1003, 1005, and 1007, respectively. Based on the major based selection method in Eq. 8, the selected search center is set to be the centroid 1003 of the MV cluster with 20 initial MV candidates (indicated with a pentagon). When the initial MV candidates are sparsely distributed, it is possible that the numbers of the initial MV candidates included in different MV clusters are relatively similar. In such case, different MV clusters may play an equal role to derive the optimal motion for the current CU/Sub-CU.

Figure 10B:
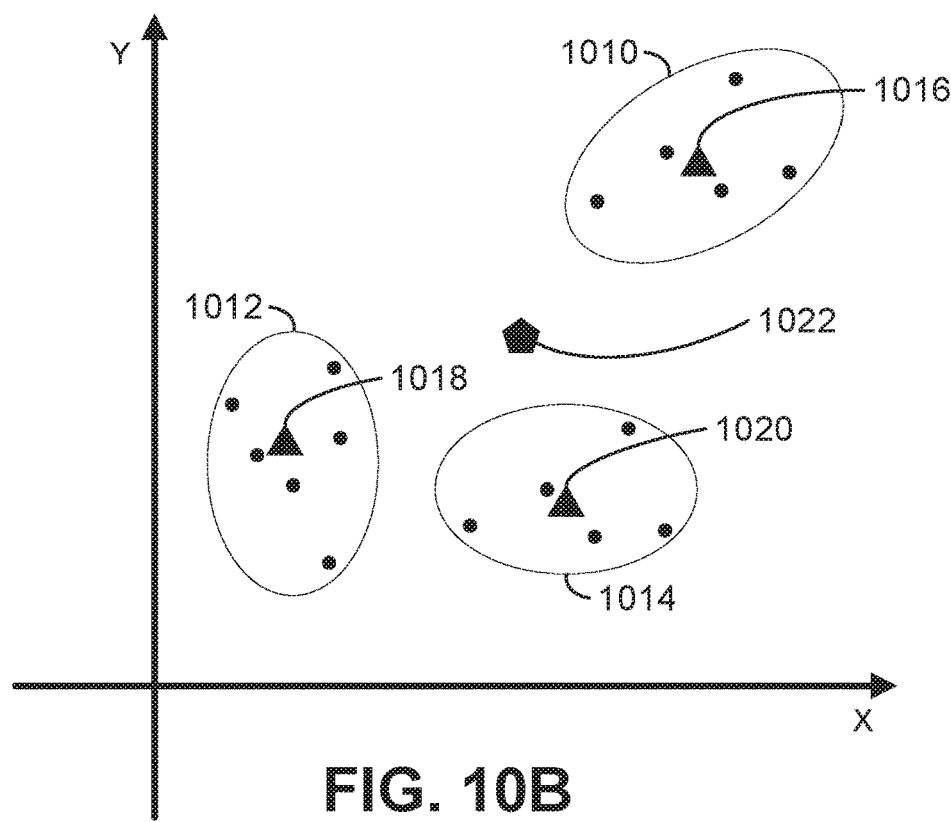

In another embodiment of the disclosure, when the generated clusters show similar coverage of the MV candidates in the initial MV candidate list (e.g., there is no dominant MV cluster over the others), it is proposed to average the centroids of all the MV clusters and use the average as the search center for the following CU-/Sub-CU-level initial motion search. FIG. 10B shows one example to illustrate the average-based search center selection method, where the three MV clusters 1010, 1012, 1014 contain the same number of initial MV candidates. Respective centroids of the MV clusters are illustrated by triangles 1016, 1018, 1020. Different methods may be applied to determine whether the generated clusters have similar coverage of the initial MV candidates or not. In one example, the difference between (i) the number of the MV candidates included in the MV cluster which has the maximum coverage and (ii) the number included in the MV cluster which has the minimum coverage may be used. If the difference is smaller than a pre-defined threshold, the generated clusters are regarded to have similar coverage (i.e., average-based search center determination should be applied); otherwise, the respective coverages of different clusters are deemed as unbalanced such that the majority-based search center determination should be applied. In the example of FIG. 10B, in response to a determination that the clusters 1010, 1012, 1014 have similar coverage of the initial MV candidates, the selected search center is the average of the centroids 1016, 1018, 1020. The selected search center is illustrated by the pentagon at 1022.

It may be noted that FIGS. 10A and 10B both illustrate embodiments in which the selected search center is the average of one or more major MV candidates. Specifically, in the embodiment of FIG. 10A, the selected search center is the average of only one major MV candidate and thus is equal to the candidate itself, while in the embodiment of FIG. 10B, the selected search center is the average of more than one MV candidate.

Figure 11:
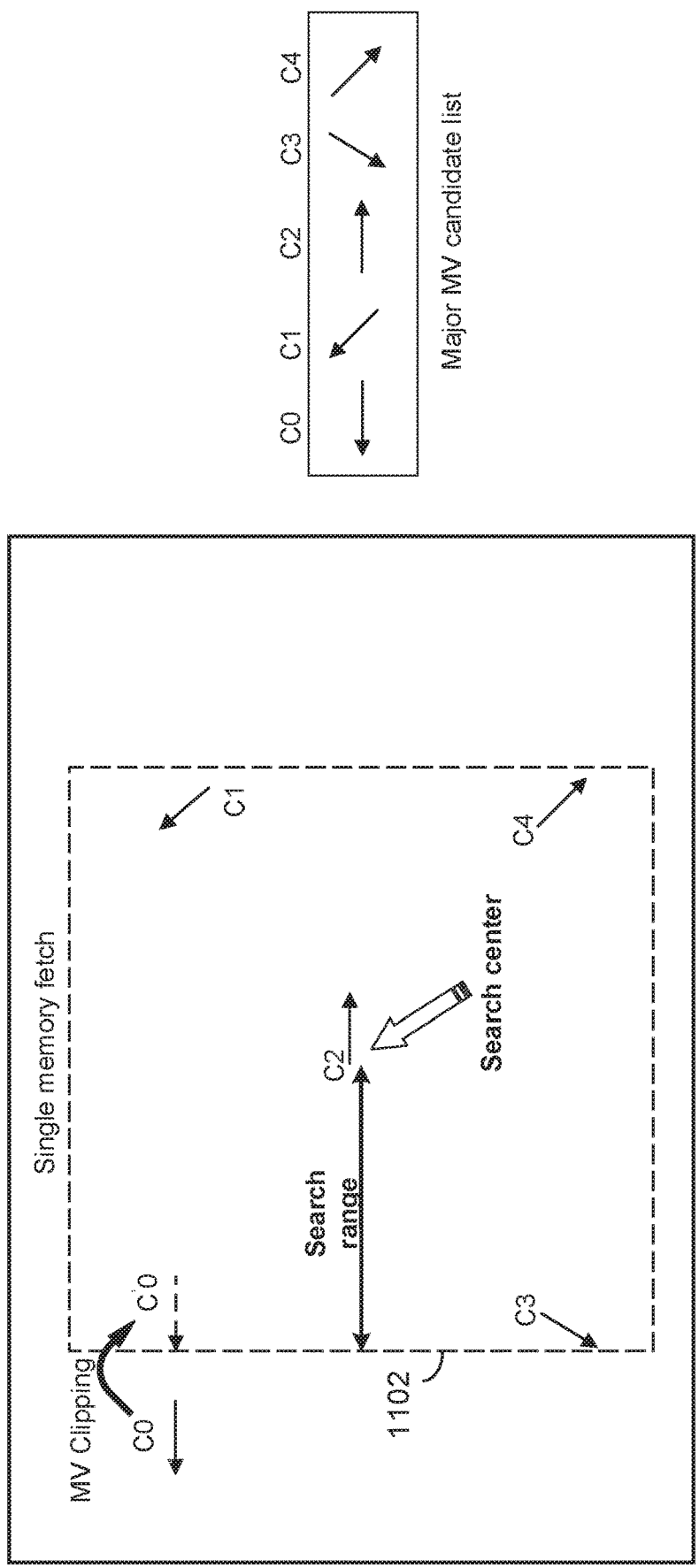
FIG. 11 illustrates memory access in exemplary embodiments after the constrained search range is applied to the initial CU-level/sub-CU-level motion search.

Referring again to FIG. 9, after the search center is calculated, a search window is determined (910) whose center is set to the selected search center and width is set to a selected range (e.g. a predefined or signaled range). After that, the major MVs (e.g. the centroids of the MV clusters) are updated by clipping each major MV into the search window (911). Based on the same example in FIG. 7, FIG. 11 illustrates the external memory access after the proposed search constraint is applied to the CU-/Sub-CU-level initial motion search. Based on the comparison between FIG. 7 and FIG. 11, it can be seen that compared to the unconstrained motion search (which in this example uses five separate memory accesses to the reference picture), only one single external memory access to corresponding region (as indicated by the search window 1102) is used by the constrained motion search to fetch all the reference samples that are needed to decide the optimal MV (912) for the initial CU-/Sub-CU-level motion search. This may efficiently reduce the memory bandwidth used by the FRUC for the encoder/decoder hardware.

In the above description, the same search range is applied to both the CU-level initial motion search and the sub-CU-level initial motion search. However, given that the sub-CU-level motion search is based on the MV that is derived from the CU-level motion search, the initial MV candidates that are generated for each sub-CU are usually more correlated than the initial MV candidates that are generated at the CU-level. Therefore, it is reasonable to use smaller search range for the sub-CU-level motion search than that used for the CU-level motion search. This can further reduce the size of the region to be accessed from the reference picture.

In the above, a proposed constrained CU-/sub-CU-level initial motion search was described in a case in which the MV clustering is applied. However, in practice, the constrained motion search can be independently used. That is, constrained motion search can be applied with or without the MV clustering. When MV clustering is not applied, the constrained motion search may further consider the reference pictures where the initial MV candidates come from and be separately applied to the set of the MV candidates that are from the same reference picture.

Constrained Search Range for CU-Level Motion Refinement, Sub-CU-Level Initial Motion Search and Sub-CU-Level Motion Refinement.

As described above, the search area of the sub-CU-level motion search is in general unrestricted, given that each sub-CU inside a current CU can derive its own initial MVs which can be far apart from each other. Such design can also demand significant memory bandwidth usage for a practical hardware implementation. To address such a problem, it is proposed in some embodiments to add a search range constraint for the all the FRUC-related motion search processes after the CU-level initial motion search, including CU-level motion refinement, sub-CU-level initial motion search and sub-CU-level motion refinement.

Figure 12:
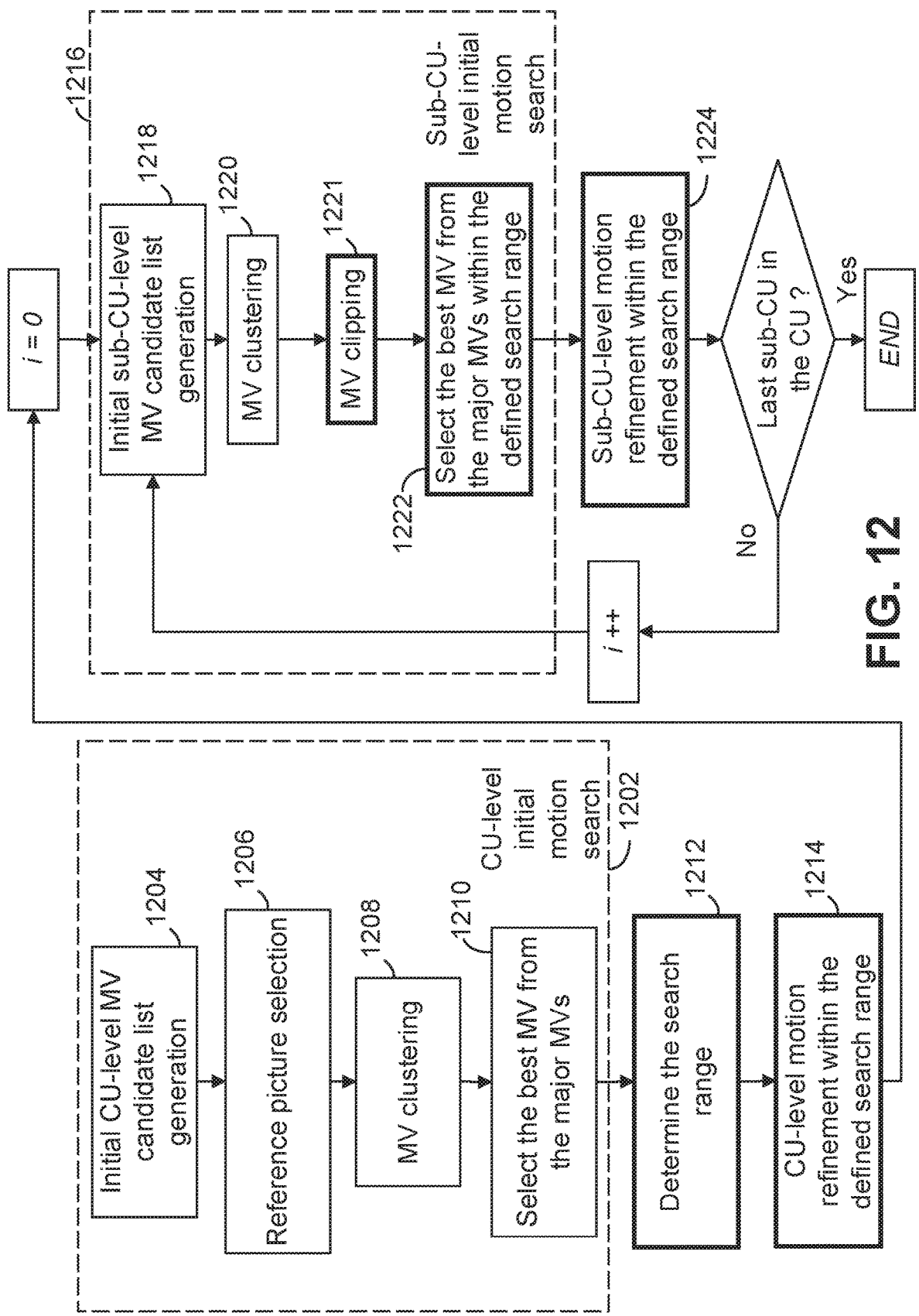
FIG. 12 is a flowchart of a FRUC motion search process in an exemplary embodiment after the constrained search range is applied to CU-level motion refinement, sub-CU-level initial motion search and sub-CU-level motion refinement.

FIG. 12 illustrates a modified FRUC motion search process after the proposed search range is applied to CU-level motion refinement, sub-CU-level initial motion search and sub-CU-level motion refinement. Specifically, in FIG. 12, a search window is determined (1212) after the CU-level initial motion search by setting the CU-level initial MV as the search center; then, the following CU-level motion refinement is only performed within the search window. At the sub-CU-level, all the MV candidates that are obtained for each sub-CU are clipped (1221) to the region of the search window and the motion refinement of each sub-CU is also only permitted within the search window. By doing so, it may use one single memory access to the external reference picture after the CU-level initial MV is obtained. In comparison, other FRUC designs can require an external memory access for the motion search of each sub-CU, and there can be up to 64 sub-CUs inside a CU. Therefore, after the CU-level initial MV is determined, the other FRUC methods may use as many as 64 separate memory accesses to generate the motion information of the CU. In this sense, exemplary embodiments can reduce the memory bandwidth usage for the FRUC.

In a method according to FIG. 12, in a CU-level initial motion search (1202), an initial CU-level MV candidate list is generated (1204) and a reference picture is selected (1206). The MVs in the MV candidate list are clustered (1208), with a major MV representing each cluster. The major MV of a cluster may be the centroid of the MV candidates in the cluster, and a search is performed to select the best major MV (1210). For CU-level motion refinement, a search range is determined (1212), and CU-level motion refinement is performed within the search range (1214). After CU-level motion refinement, a sub-CU-level initial motion search (1216) is performed. For each sub-CU in the CU, an initial sub-CU-level MV candidate list is generated (1218) and the sub-CU-level MVs are clustered (1220), each cluster being represented by a major MV. The major MVs are processed by clipping (1221) as needed such that the major MVs fall within the search window. The best MV is selected from the processed major MVs within the defined search range (1222). After the sub-CU-level motion search (1216), a sub-CU-level motion refinement is performed within the defined search range (1224).

FRUC Motion Search in One Unified Search Range.

Figure 13:
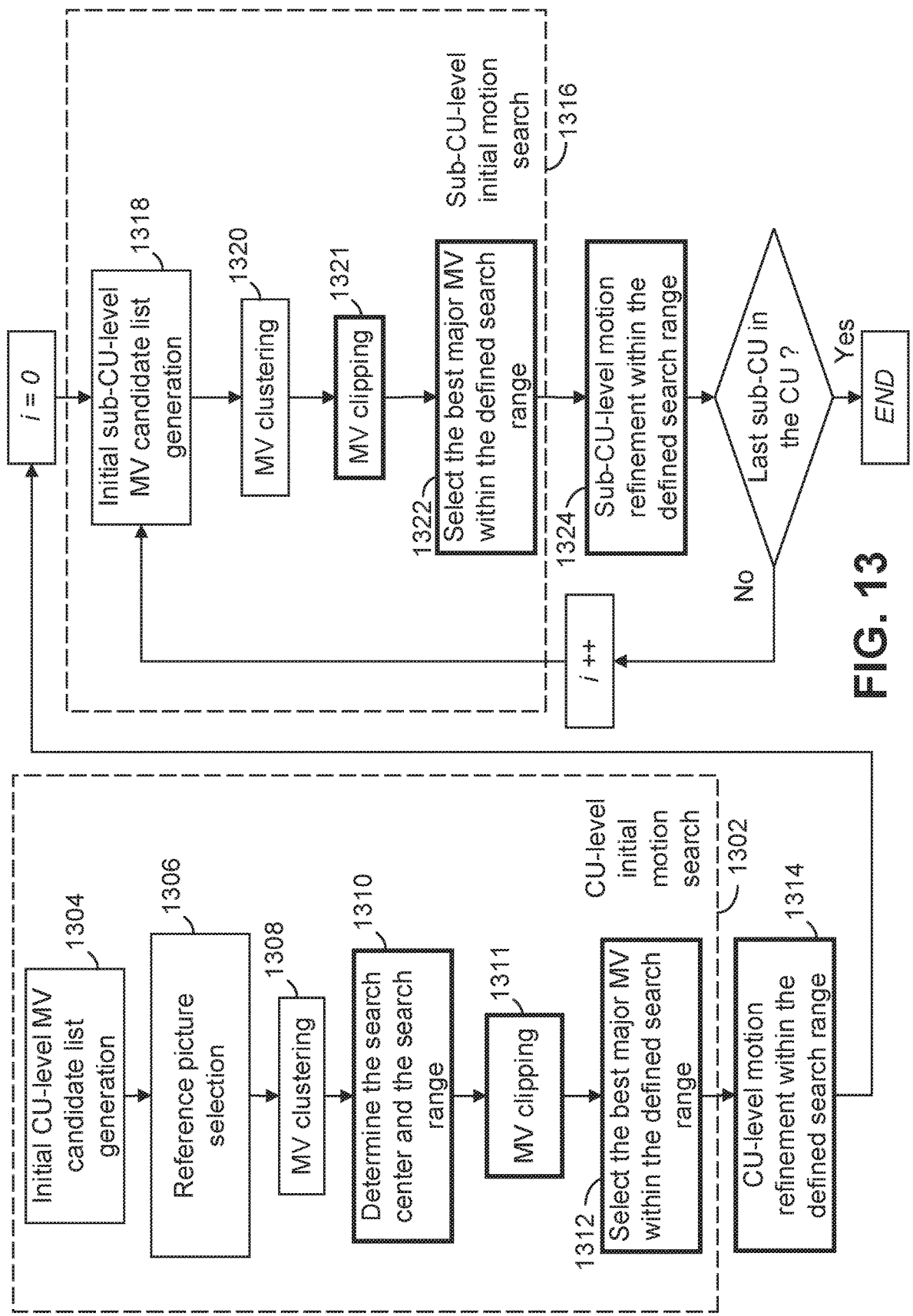
FIG. 13 is a flowchart of an exemplary FRUC motion search process after the unified search range is applied to the whole FRUC process.

Although the constrained motion search methods described above can provide significant memory bandwidth reductions as compared to other FRUC methods, some such embodiments still use at least two separate memory accesses to the external buffer of the reference picture: one is used for the CU-level initial motion search for generating the CU-level initial MV and the other is used for the other FRUC motion search process for generating the MVs of the sub-CUs inside the current CU. To further reduce the FRUC memory bandwidth, a unified search range is proposed for all the FRUC-related motion search processes such that only one single memory access to the external reference picture is used for the whole FRUC process. FIG. 13 depicts the modified FRUC motion derivation after the unified search range is applied to the entire FRUC motion search process. More specifically, after the MV clustering (1308), a search center is determined from the major MV candidates based on Eqs. 8 and 9, and a search window may be determined (1310) whose center is set to the selected search center and width is set to a selected range.

The subsequent CU-level motion refinement (1314) and the sub-CU-level motion search—including sub-CU-level initial motion search (1316) and sub-CU-level motion refinement (1324)—will be only allowed to search MV candidates inside the defined search window. In the example of FIG. 13, with the proposed unified search range, only one single external memory access to the selected reference picture is used to fetch the reference samples in the size of the search window to generate the motion information of the entire CU. Moreover, as the unified search method as mentioned above reduces the number of external memory accesses, it is reasonable to use a larger search range than that used for the constrained search methods in embodiments described above for a better trade-off between the coding performance and the memory bandwidth usage.

As illustrated in FIG. 13, in a CU-level initial motion search (1302), an initial CU-level MV candidate list is generated (1304) and a reference picture is selected (1306). The MVs in the MV candidate list are clustered (1308), with a major MV representing each cluster. The major MV of a cluster may be the centroid of the MV candidates in the cluster. Based on the major MVs, the search center and the search range are determined (1310). The major MVs are processed by clipping the major MVs (1311) as appropriate such that they fall within the search range, and a search is performed to select the best processed major MV (1312). CU-level motion refinement (1314) is performed on the selected MV. After CU-level motion refinement, a sub-CU-level initial motion search (1316) is performed. For each sub-CU in the CU, an initial sub-CU-level MV candidate list is generated (1318) and the sub-CU-level MVs are clustered (1320), each cluster being represented by a major MV. The major MVs are processed by clipping (1321) as appropriate to fall within the search range. A best processed major MV is selected within the search region (1322), and sub-CU level motion refinement (1324) is performed.

Adaptive Search Range for the FRUC Motion Search.

In some embodiments of the constrained FRUC motion search methods described above, the same search range is applied to all the pictures in one video sequence. However, in alternative embodiments, the search range may be adaptively adjusted at different levels, e.g., sequence-level, picture-level and block-level; and each adaptation level may provide a different performance/complexity trade-off. Additionally, when the adaptive search range is applied, different methods may be applied to determine the optimal search range. For example, when the search range is adapted at the picture-level, depending on the correlation between the current picture and its reference pictures, video blocks in some pictures can show steady motion (e.g., the pictures at the high temporal layer of random access configuration) while the motion of video blocks in some pictures are relatively unstable e.g., the pictures at the low temporal layer of random access configuration). In such case, it may be more beneficial to use smaller search range for the pictures with stable motion than that used for the pictures with unstable motion to achieve larger memory access reduction while preserving the coding performance. In another example, when the search range is adapted at block-level, the optimal search range of a block may be determined based on the correlation of the MVs of the spatial neighbors of the current block. To measure the motion correlation, one method is to calculate the variance of the neighboring MVs of the current block. If the motion variance is smaller than a pre-defined threshold, it is reasonable to believe that the motion of the current block is highly correlated with that of its neighbors and a small search range can be safely applied; otherwise, the current block's motion is regarded to be less correlated with its neighbors and a large search range should be applied to ensure the optimal MV of the current block can be identified within the search window. In another method, it is proposed to adaptively adjust the search range based on block size. The consideration behind this method is that when the size of the current block is larger, it is more likely that the current block contains more complicated content (e.g., rich textures and/or directional edges); therefore, a large search range may be applied which can help the current block find a good match from the reference picture. Otherwise, if the current block has a relatively small size, it is reasonable to assume that the current block may contain less texture information; correspondingly, a small search window can be good enough in this case. In another embodiment of the disclosure, it is proposed to adaptively adjust the search range based on the POC distance between the current picture and its reference pictures. Specifically, by the method, if the POC distance between the current picture and its closest reference picture is smaller than a pre-defined threshold, the blocks in the current picture may show steady motion and a smaller search range may be applied; otherwise (if the POC distance between the current picture and its closest reference picture larger and equal to the pre-defined threshold), the motions of the blocks inside the current picture may be unstable where a large search range should be applied.

When the adaptive search range is applied to the FRUC, the corresponding search range may be either signaled in bit-stream (e.g., in video parameters set (VPS), sequence parameter set (SPS), picture parameter set (PPS) and slice segment header) or derived at both encoder and decoder without signaling.

Complexity Restricted Motion Search for FRUC.

Restriction on the Number of Search Iterations for the FRUC Motion Refinement.

In known FRUC designs, both the CU-level motion refinement and the sub-CU-level motion refinement are computation-wise unrestricted in the sense that the refinement search continues unless the search center is updated between two consecutive search loops. Such a design is not practical to the pipeline design of real encoder/decoder hardware implementation, because the encoding/decoding complexity of a FRUC block is unbounded. Therefore, to make the FRUC design more friendly to the hardware implementation, it is proposed to make restrictions on the maximum number of search iterations that are performed at the CU-/sub-CU-level motion refinement stage. Similar to the constrained search range for CU-Level Initial Motion Search described above, the maximum number of search iterations can be adapted or signaled at different coding levels, such as, sequence level, picture level and block-level. Additionally, the same maximum search iteration number may be applied to the CU-level motion refinement and the sub-CU-level motion refinement. But, since the sub-CU-level motion candidates usually show stronger correlations than the CU-level motion candidates, it is also proposed in at least some embodiments to set the value of the maximum search iteration to be larger for the CU-level motion refinement than for the sub-CU-level motion refinement.

Restriction on the Number of Major MVs for MV Clustering.

Although an MV clustering method such as those described above can significantly reduce the average computational complexity of the initial MV derivation (at both CU-level and sub-CU-level), it does not necessarily change the maximum of the MV candidates that need to be tested. For example, in the worst case, there may still be up to 15 and 17 MV candidates to be examined at the CU-level motion search and the sub-CU-level motion search, respectively. In practice, worst-case scenario is a crucial consideration for real encoder/decoder implementation, which directly determines the processing capabilities/conditions to be satisfied by the hardware design. Therefore, it is proposed in some embodiments to impose a constraint on the number of the major MVs that are generated from the MV clustering to reduce both the average and the maximum of the tested MV candidates. Given the maximum number of the major MVs (e.g., L), different criteria may be utilized to determine which major MVs should be selected for the FRUC motion search.

One criterion used in some embodiments is to select major MVs based on MV candidate coverage. In some embodiments using this criterion, the encoder/decoder counts the number of initial MVs in the initial MV candidate list (MV candidate coverage) that are contained in each MV cluster (either CU-level or sub-CU-level); then, the encoder/decoder orders the generated major MVs according to the MV candidate coverage by putting the major MVs with more coverages at beginning of the list, and only maintains the first L major MVs as the output that is further used for the following CU-/sub-CU-level motion search processes.

Another criterion used in some embodiments is to select MVs based on MV candidate variance. In some embodiments using such a criterion, the encoder/decoder calculates during the MV clustering process the variance of the initial MVs that are included in each MV cluster; then, the encoder/decoder orders the generated major MVs in the ascending order of the MV candidate variance and only maintains the first major MVs with smallest MV candidate variance as the output for the following CU-level or sub-CU-level motion search processes.

The maximum number of major MVs can be adapted or signaled at different coding levels, such as, sequence level, picture level and block-level. Additionally, different maximum values may be used for the MV clustering processes that are applied at the CU-level motion search and the sub-CU-level motion search.

Methods Using Constrained Search Range for CU-Level Initial Motion Search.

In some embodiments, a method is provided of coding a video comprising a plurality of pictures including a current picture. The method includes, for at least one current block in the current picture: identifying a first set of motion vector candidates for frame-rate up conversion (FRUC) prediction of the block; defining a search center based on the first set of motion vector candidates; determining a search window, the search window having a selected width and being centered on the search center; processing the first set of motion vector candidates by clipping any motion vector in the first set that falls outside the search window so as to fall within the search window; and performing a search for a selected motion vector from among the processed first set of motion vector candidates. The search center may be, for example, an average of the first set of motion vector candidates Some such embodiments further include: performing a motion refinement search based on the selected motion vector candidate to generate a refined motion vector; and predicting the block using the refined motion vector.

The current block may be, for example, a coding unit or a sub-coding-unit block.

The selected motion vector may be selected so as to achieve a lowest matching cost or a lowest sum of absolute differences (SAD).

In some embodiments, the first set of motion vector candidates is generated by a method that includes: clustering an initial set of motion vector candidates into a plurality of clusters; and for each cluster, calculating a centroid of the respective cluster and contributing a centroid motion vector representing the centroid of the respective cluster to the first set of motion vector candidates. In such embodiments, the search center may be the center of the cluster having the most motion vector candidates.

The selected width may be signaled, for example, in a VPS, an SPS, a PPS, a slice segment header, or at the block level. In some embodiments, the selected width for the current picture is determined based at least in part on a level of stability of motion in the current picture. In some embodiments, the selected width for the current block is determined based at least in part on a level of correlation of the motion vectors of spatial neighbors of the current block. In some embodiments, the selected width for the current block is determined based at least in part on size of the current block. In some embodiments, the selected width for the current picture is determined based at least in part on a POC distance between the current picture and its reference pictures.

Methods Using Constrained Search Range for CU-Level Motion Refinement, Sub-CU-Level Initial Motion Search, and Sub-CU-Level Motion Refinement.

In some embodiments, a method is provided of coding a video comprising a plurality of pictures including a current picture. The method includes, for at least one current coding unit (CU) in the current picture: identifying a first set of motion vector candidates for frame-rate up conversion (FRUC) prediction of the coding unit; performing a search for a selected CU-level motion vector from among the first set of motion vector candidates; determining a search window, the search window having a selected width and being centered on the selected CU-level motion vector; and performing a motion refinement search within the search window to generate a refined CU-level motion vector. The coding unit may be predicted using the refined CU-level motion vector.

In some embodiment, the method further includes: identifying a set of sub-CU initial motion vectors and, for each sub-CU within the coding unit: processing the set of sub-CU initial motion vectors by clipping any motion vector in the set that falls outside the search window so as to fall within the search window; performing a search for a selected sub-CU motion vector from among the processed set of sub-CU initial motion vectors; and performing a motion refinement search within the search window to generate a refined sub-CU motion vector. The sub-CU may be predicted using the refined sub-CU-level motion vector.

The selected width may be signaled in a video parameter set (VPS), a sequence parameter set (SPS), a picture parameter set (PPS), a slice segment header, or at the block level. The selected width for the current picture may be determined based at least in part on a level of stability of motion in the current picture. The selected width for the current block may be determined based at least in part on a level of correlation of the motion vectors of spatial neighbors of the current block. The selected width for the current block may be determined based at least in part on the size of the current block. The selected width for the current picture may be determined based at least in part on a POC distance between the current picture and its reference pictures.

Methods Using FRUC Motion Search in a Unified Search Range.

In some embodiments, a method is provided of coding a video comprising a plurality of pictures including a current picture. The method includes, for at least one coding unit (CU) in the current picture: identifying a first set of CU-level motion vector candidates for frame-rate up conversion (FRUC) prediction of the coding unit; defining a search center based on the first set of CU-level motion vector candidates (e.g. as an average of the first set of CU-level motion vector candidates); determining a search window, the search window having a selected width and being centered on the search center; processing the first set of CU-level motion vector candidates by clipping any motion vector in the first set that falls outside the search window so as to fall within the search window; performing a search for a selected CU-level motion vector from among the processed first set of motion vector candidates; performing a motion refinement search within the search window to generate a refined CU-level motion vector; identifying a set of sub-CU initial motion vectors; and for each sub-CU within the coding unit: processing the set of sub-CU initial motion vectors by clipping any motion vector in the set that falls outside the search window so as to fall within the search window; performing a search for a selected sub-CU motion vector from among the processed set of sub-CU initial motion vectors; and performing a motion refinement search within the search window to generate a refined sub-CU motion vector.

In some such embodiments, the first set of CU-level motion vector candidates by clustering an initial set of CU-level motion vector candidates into a plurality of clusters; and for each cluster, calculating a centroid of the respective cluster and contributing a centroid motion vector representing the centroid of the respective cluster to the first set of motion vector candidates. The search center may be the center of the cluster having the most CU-level motion vector candidates.

The selected width may be signaled in a video parameter set (VPS), a sequence parameter set (SPS), a picture parameter set (PPS), a slice segment header, or at the block level. The selected width for the current picture may be determined based at least in part on a level of stability of motion in the current picture. The selected width for the current block may be determined based at least in part on a level of correlation of the motion vectors of spatial neighbors of the current block. The selected width for the current block may be determined based at least in part on the size of the current block. The selected width for the current picture may be determined based at least in part on a POC distance between the current picture and its reference pictures.

Methods Using Restriction of the Number of Search Iterations for FRUC Motion Refinement.

In some embodiments, a method is provided of coding a video comprising a plurality of pictures including a current picture. The method includes, for at least one block in the current picture: identifying a first set of motion vector candidates for frame-rate up conversion (FRUC) prediction of the block; performing a search for a selected motion vector from among the first set of motion vector candidates; and performing a motion refinement search based on the selected motion vector candidate to generate a refined motion vector, wherein the motion refinement search is limited to a selected maximum number of iterations. The block may be a coding unit or a sub-coding-unit block.

The selected maximum number of iterations may depend at least in part on whether the block is a coding unit or a sub-coding-unit block. The selected maximum number of iterations may be signaled at the sequence level, at the picture level, at the block level, or in a slice segment header.

Methods Using Restriction on the Number of Major MVs for MV Clustering.

In some embodiments, a method is provided of coding a video comprising a plurality of pictures including a current picture. The method includes, for at least one block in the current picture (e.g. a coding unit or a sub-coding-unit block): clustering an initial set of motion vector candidates into a plurality of clusters; and for each cluster, calculating a centroid of the respective cluster and contributing a centroid motion vector representing the centroid of the respective cluster to a set of major motion vectors; choosing no more than a selected maximum number of motion vectors from the set of major motion vectors to generate a constrained set of motion vectors; and performing a search for a selected motion vector from among the constrained set of motion vector candidates.

In some embodiments, the choosing of no more than the selected maximum number of motion vectors includes choosing, from the set of major motion vectors, the major motion vectors representing the cluster having the greatest numbers of initial motion vector candidates. In some embodiments, the choosing of no more than the selected maximum number of motion vectors includes choosing, from the set of major motion vectors, the major motion vectors representing the clusters having the smallest variance among motion vector candidates.

The selected maximum number of motion vectors may depend at least in part on whether the block is a coding unit or a sub-coding-unit block. The selected maximum number of motion vectors may be signaled at the sequence level, at the picture level, at the block level, or in a slice segment header.

Coded Bitstream Structure.

Figure 14:
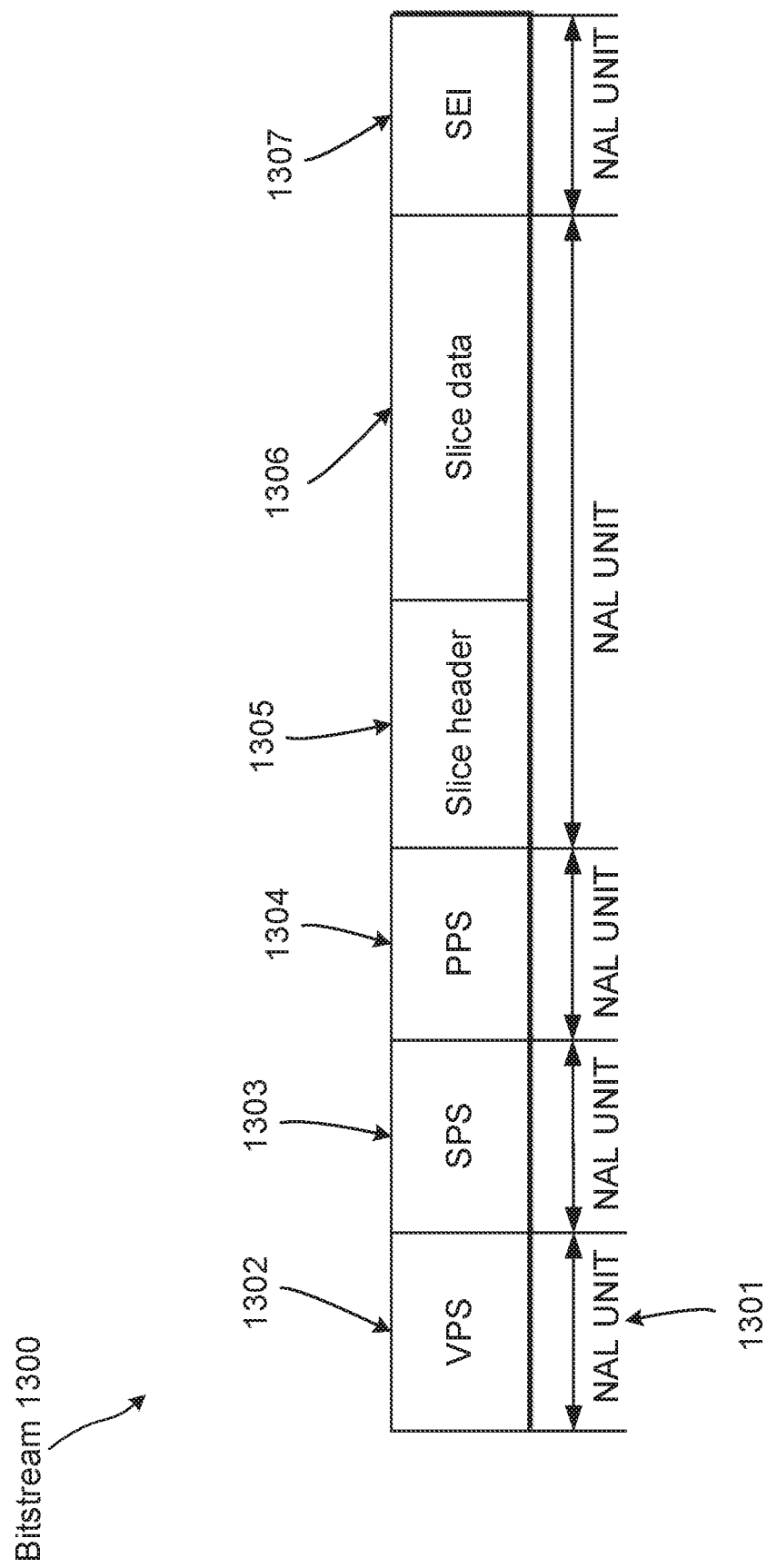
FIG. 14 is a diagram illustrating an example of a coded bitstream structure.

FIG. 14 is a diagram illustrating an example of a coded bitstream structure. A coded bitstream 1300 consists of a number of NAL (Network Abstraction layer) units 1301. A NAL unit may contain coded sample data such as coded slice 1306, or high level syntax metadata such as parameter set data, slice header data 1305 or supplemental enhancement information data 1307 (which may be referred to as an SEI message). Parameter sets are high level syntax structures containing essential syntax elements that may apply to multiple bitstream layers (e.g. video parameter set 1302 (VPS)), or may apply to a coded video sequence within one layer (e.g. sequence parameter set 1303 (SPS)), or may apply to a number of coded pictures within one coded video sequence (e.g. picture parameter set 1304 (PPS)). The parameter sets can be either sent together with the coded pictures of the video bit stream, or sent through other means (including out-of-band transmission using reliable channels, hard coding, etc.). Slice header 1305 is also a high level syntax structure that may contain some picture-related information that is relatively small or relevant only for certain slice or picture types. SEI messages 1307 carry the information that may not be needed by the decoding process but can be used for various other purposes such as picture output timing or display as well as loss detection and concealment.

Communication Devices and Systems.

Figure 15:
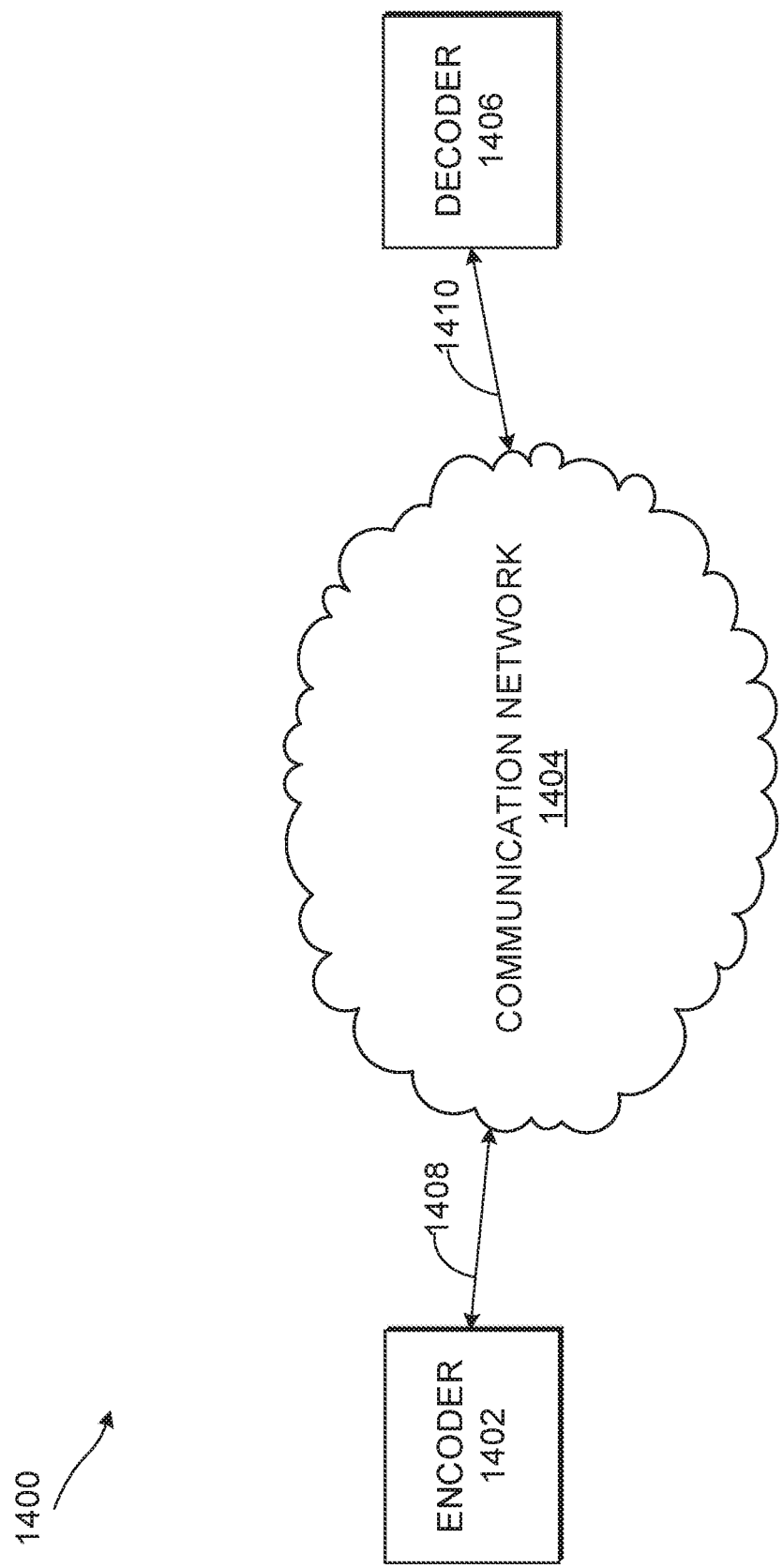
FIG. 15 is a diagram illustrating an example communication system.

FIG. 15 is a diagram illustrating an example of a communication system. The communication system 1400 may comprise an encoder 1402, a communication network 1404, and a decoder 1406. The encoder 1402 may be in communication with the network 1404 via a connection 1408, which may be a wireline connection or a wireless connection. The encoder 1402 may be similar to the block-based video encoder of FIG. 1. The encoder 1402 may include a single layer codec (e.g., FIG. 1) or a multilayer codec. The decoder 1406 may be in communication with the network 1404 via a connection 1410, which may be a wireline connection or a wireless connection. The decoder 1406 may be similar to the block-based video decoder of FIG. 2. The decoder 1406 may include a single layer codec (e.g., FIG. 2) or a multilayer codec.

The encoder 1402 and/or the decoder 1406 may be incorporated into a wide variety of wired communication devices and/or wireless transmit/receive units (WTRUs), such as, but not limited to, digital televisions, wireless broadcast systems, a network element/terminal, servers, such as content or web servers (e.g., such as a Hypertext Transfer Protocol (HTTP) server), personal digital assistants (PDAs), laptop or desktop computers, tablet computers, digital cameras, digital recording devices, video gaming devices, video game consoles, cellular or satellite radio telephones, digital media players, and/or the like.

The communications network 1404 may be a suitable type of communication network. For example, the communications network 1404 may be a multiple access system that provides content, such as voice, data, video, messaging, broadcast, etc., to multiple wireless users. The communications network 1404 may enable multiple wireless users to access such content through the sharing of system resources, including wireless bandwidth. For example, the communications network 1404 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like. The communication network 1404 may include multiple connected communication networks. The communication network 1404 may include the Internet and/or one or more private commercial networks such as cellular networks, WiFi hotspots, Internet Service Provider (ISP) networks, and/or the like.

Figure 16:
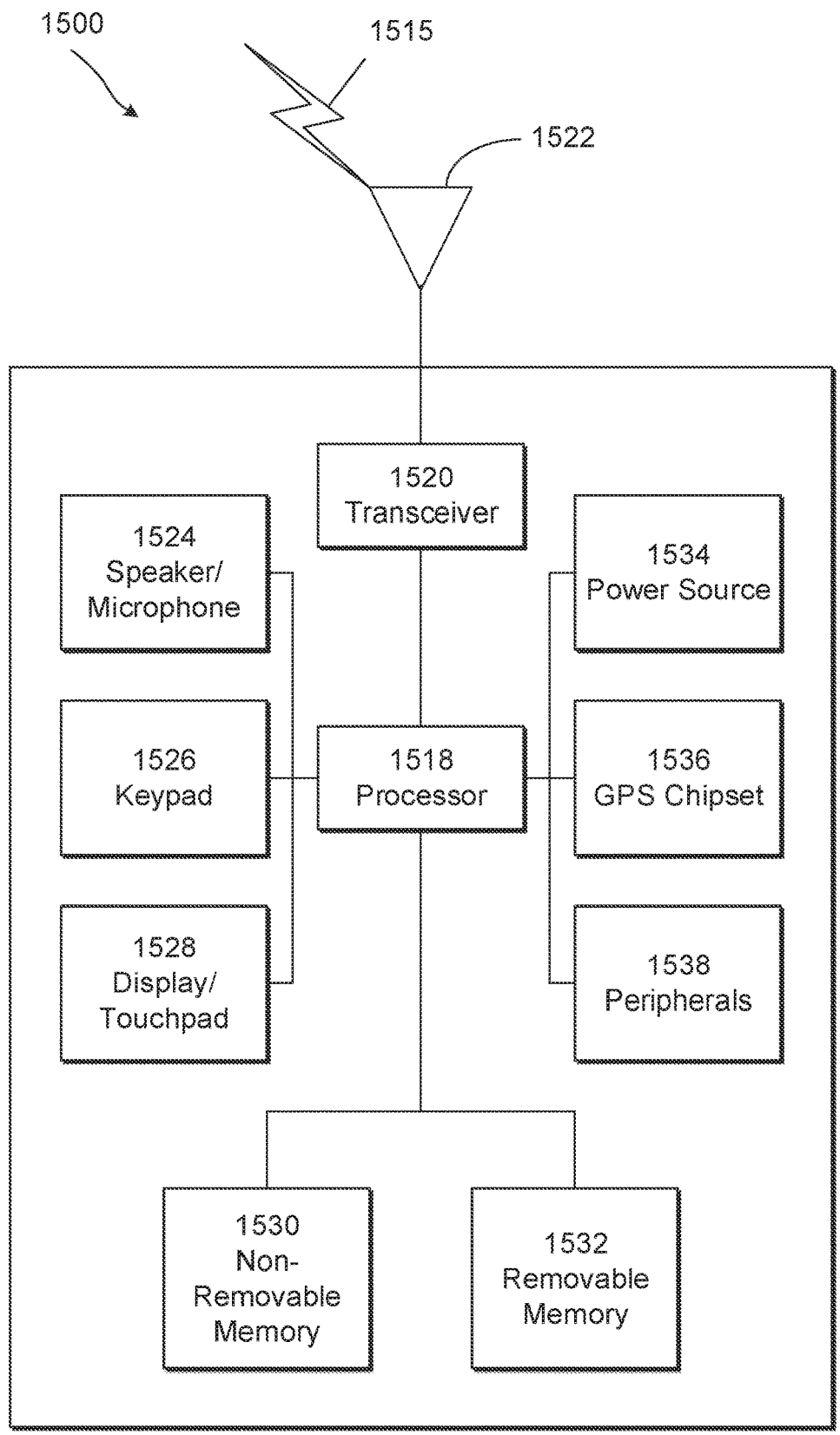
FIG. 16 is a diagram illustrating an example wireless transmit/receive unit (WTRU).

FIG. 16 is a system diagram of an example WTRU. As shown, the example WTRU 1500 may include a processor 1518, a transceiver 1520, a transmit/receive element 1522, a speaker/microphone 1524, a keypad or keyboard 1526, a display/touchpad 1528, non-removable memory 1530, removable memory 1532, a power source 1534, a global positioning system (GPS) chipset 1536, and/or other peripherals 1538. It will be appreciated that the WTRU 1500 may include any sub-combination of the foregoing elements while remaining consistent with an embodiment. Further, a terminal in which an encoder (e.g., encoder 100) and/or a decoder (e.g., decoder 200) is incorporated may include some or all of the elements depicted in and described herein with reference to the WTRU 1500 of FIG. 16.

The processor 1518 may be a general purpose processor, a special purpose processor, a conventional processor, a digital signal processor (DSP), a graphics processing unit (GPU), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1518 may perform signal coding, data processing, power control, input/output processing, and/or any other functionality that enables the WTRU 1500 to operate in a wired and/or wireless environment. The processor 1518 may be coupled to the transceiver 1520, which may be coupled to the transmit/receive element 1522. While FIG. 16 depicts the processor 1518 and the transceiver 1520 as separate components, it will be appreciated that the processor 1518 and the transceiver 1520 may be integrated together in an electronic package and/or chip.

The transmit/receive element 1522 may be configured to transmit signals to, and/or receive signals from, another terminal over an air interface 1515. For example, in one or more embodiments, the transmit/receive element 1522 may be an antenna configured to transmit and/or receive RF signals. In one or more embodiments, the transmit/receive element 1522 may be an emitter/detector configured to transmit and/or receive IR, UV, or visible light signals, for example. In one or more embodiments, the transmit/receive element 1522 may be configured to transmit and/or receive both RF and light signals. It will be appreciated that the transmit/receive element 1522 may be configured to transmit and/or receive any combination of wireless signals.

In addition, although the transmit/receive element 1522 is depicted in FIG. 16 as a single element, the WTRU 1500 may include any number of transmit/receive elements 1522. More specifically, the WTRU 1500 may employ MIMO technology. Thus, in one embodiment, the WTRU 1500 may include two or more transmit/receive elements 1522 (e.g., multiple antennas) for transmitting and receiving wireless signals over the air interface 1515.

The transceiver 1520 may be configured to modulate the signals that are to be transmitted by the transmit/receive element 1522 and/or to demodulate the signals that are received by the transmit/receive element 1522. As noted above, the WTRU 1500 may have multi-mode capabilities. Thus, the transceiver 1520 may include multiple transceivers for enabling the WTRU 1500 to communicate via multiple RATs, such as UTRA and IEEE 802.11, for example.

The processor 1518 of the WTRU 1500 may be coupled to, and may receive user input data from, the speaker/microphone 1524, the keypad 1526, and/or the display/touchpad 1528 (e.g., a liquid crystal display (LCD) display unit or organic light-emitting diode (OLED) display unit). The processor 1518 may also output user data to the speaker/microphone 1524, the keypad 1526, and/or the display/touchpad 1528. In addition, the processor 1518 may access information from, and store data in, any type of suitable memory, such as the non-removable memory 1530 and/or the removable memory 1532. The non-removable memory 1530 may include random-access memory (RAM), read-only memory (ROM), a hard disk, or any other type of memory storage device. The removable memory 1532 may include a subscriber identity module (SIM) card, a memory stick, a secure digital (SD) memory card, and the like. In one or more embodiments, the processor 1518 may access information from, and store data in, memory that is not physically located on the WTRU 1500, such as on a server or a home computer (not shown).

The processor 1518 may receive power from the power source 1534, and may be configured to distribute and/or control the power to the other components in the WTRU 1500. The power source 1534 may be any suitable device for powering the WTRU 1500. For example, the power source 1534 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1518 may be coupled to the GPS chipset 1536, which may be configured to provide location information (e.g., longitude and latitude) regarding the current location of the WTRU 1500. In addition to, or in lieu of, the information from the GPS chipset 1536, the WTRU 1500 may receive location information over the air interface 1515 from a terminal (e.g., a base station) and/or determine its location based on the timing of the signals being received from two or more nearby base stations. It will be appreciated that the WTRU 1500 may acquire location information by way of any suitable location-determination method while remaining consistent with an embodiment.

The processor 1518 may further be coupled to other peripherals 1538, which may include one or more software and/or hardware modules that provide additional features, functionality and/or wired or wireless connectivity. For example, the peripherals 1538 may include an accelerometer, orientation sensors, motion sensors, a proximity sensor, an e-compass, a satellite transceiver, a digital camera and/or video recorder (e.g., for photographs and/or video), a universal serial bus (USB) port, a vibration device, a television transceiver, a hands free headset, a Bluetooth® module, a frequency modulated (FM) radio unit, and software modules such as a digital music player, a media player, a video game player module, an Internet browser, and the like.

By way of example, the WTRU 1500 may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a tablet computer, a personal computer, a wireless sensor, consumer electronics, or any other terminal capable of receiving and processing compressed video communications.

The WTRU 1500 and/or a communication network (e.g., communication network 804) may implement a radio technology such as Universal Mobile Telecommunications System (UMTS) Terrestrial Radio Access (UTRA), which may establish the air interface 1515 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA). The WTRU 1500 and/or a communication network (e.g., communication network 804) may implement a radio technology such as Evolved UMTS Terrestrial Radio Access (E-UTRA), which may establish the air interface 1515 using Long Term Evolution (LTE) and/or LTE-Advanced (LTE-A).

The WTRU 1500 and/or a communication network (e.g., communication network 804) may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like. The WTRU 1500 and/or a communication network (e.g., communication network 804) may implement a radio technology such as IEEE 802.11, IEEE 802.15, or the like.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation. Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
   identifying a first set of motion vector candidates for frame-rate up conversion (FRUC) prediction of a current block in a video;
   defining a search center based on a first set of motion vector candidates, where the search center is an average of one or more motion vectors in the first set of motion vector candidates;
   determining a search window, the search window having a selected width and being centered on the search center;
   processing the first set of motion vector candidates by clipping any motion vector in the first set that falls outside the search window so as to fall within the search window; and
   performing a search for a selected motion vector from among the processed first set of motion vector candidates.

2. The method of claim 1, further comprising:
   performing a motion refinement search based on the selected motion vector candidate to generate a refined motion vector; and
   predicting the block with frame-rate up conversion using the refined motion vector.

3. The method of claim 1, wherein identifying the first set of motion vector candidates is performed by a method comprising:
   clustering an initial set of motion vector candidates into a plurality of clusters; and
   for each cluster, calculating a centroid of the respective cluster and contributing a centroid motion vector representing the centroid of the respective cluster to the first set of motion vector candidates.

4. The method of claim 3, wherein identifying the first set of motion vector candidates comprises limiting the first set of motion vector candidates to selected maximum number of motion vectors.

5. The method of claim 1, wherein the search center is one of the motion vectors in the first set of motion vector candidates.

6. The method of claim 1, wherein the search center is an average of the first set of motion vector candidates.

7. The method of claim 3, wherein the search center is the center of the cluster having the most motion vector candidates.

8. The method of claim 1 wherein performing a search for a selected motion vector from among the processed first set of motion vector candidates comprises selecting, from among the processed first set of motion vector candidates, a motion vector that achieves a lowest matching cost.

9. The method of claim 1 wherein the current block is a coding unit (CU), further comprising,
   performing a motion refinement search based on the selected motion vector candidate to generate a refined CU-level motion vector; and
   for each sub-CU in the coding unit:
      using the refined CU-level motion vector as a motion vector candidate in a sub-CU-level motion vector search for a selected sub-CU-level motion vector;
      refining the sub-CU-level motion vector; and
      predicting the sub-CU using the refined sub-CU-level motion vector.

10. The method of claim 1, wherein the current block is a coding unit (CU), further comprising:
    performing a motion refinement search based on the selected motion vector candidate to generate a refined CU-level motion vector; and
    for each sub-CU-level block within the coding unit:
       identifying a set of sub-CU initial motion vectors including the refined CU-level motion vector;
       clustering the sub-CU initial motion vectors into a plurality of clusters, each cluster having an associated centroid motion vector;
       processing the centroid motion vectors by clipping any centroid motion vector in the set that falls outside a sub-CU search window so as to fall within the sub-CU search window;
       performing a search for a selected sub-CU motion vector from among the processed set of centroid motion vectors;
       performing a motion refinement search within the search window to generate a refined sub-CU motion vector; and
       predicting the sub-CU-level block with frame-rate up-conversion (FRUC) using the refined sub-CU motion vector.

11. The method of claim 10, wherein the sub-CU search window is the same as the search window used in determining the CU-level motion vector.

12. The method of claim 1, further comprising selecting at least one reference picture for frame-rate up conversion (FRUC) prediction of the block, wherein the selected width for the current picture is determined based at least in part on a POC distance between the current picture and the at least one reference picture.

13. The method of claim 1, further comprising:
    performing a motion refinement search based on the selected motion vector candidate to generate a refined motion vector, wherein the motion refinement search is limited to a selected maximum number of iterations.

14. The method of claim 1, wherein the method is performed by a decoder.

15. A system comprising a processor configured to perform at least:
    identifying a first set of motion vector candidates for frame-rate up conversion (FRUC) prediction of a current block in a video;
    defining a search center based on a first set of motion vector candidates, where the search center is an average of one or more motion vectors in the first set of motion vector candidates;
    determining a search window, the search window having a selected width and being centered on the search center;
    processing the first set of motion vector candidates by clipping any motion vector in the first set that falls outside the search window so as to fall within the search window; and
    performing a search for a selected motion vector from among the processed first set of motion vector candidates.

16. The system of claim 15, further configured to perform:
    performing a motion refinement search based on the selected motion vector candidate to generate a refined motion vector; and
    predicting the block with frame-rate up conversion using the refined motion vector.

17. The system of claim 15, wherein identifying the first set of motion vector candidates is performed by a method comprising:
   clustering an initial set of motion vector candidates into a plurality of clusters; and
   for each cluster, calculating a centroid of the respective cluster and contributing a centroid motion vector representing the centroid of the respective cluster to the first set of motion vector candidates.

18. The system of claim 15 wherein performing a search for a selected motion vector from among the processed first set of motion vector candidates comprises selecting, from among the processed first set of motion vector candidates, a motion vector that achieves a lowest matching cost.

19. The system of claim 15 wherein the current block is a coding unit (CU), the processor further being configured to perform:
   performing a motion refinement search based on the selected motion vector candidate to generate a refined CU-level motion vector; and
   for each sub-CU in the coding unit:
      using the refined CU-level motion vector as a motion vector candidate in a sub-CU-level motion vector search for a selected sub-CU-level motion vector;
      refining the sub-CU-level motion vector; and
      predicting the sub-CU using the refined sub-CU-level motion vector.

20. The system of claim 15, wherein the current block is a coding unit (CU), further comprising:
   performing a motion refinement search based on the selected motion vector candidate to generate a refined CU-level motion vector; and
   for each sub-CU-level block within the coding unit:
      identifying a set of sub-CU initial motion vectors including the refined CU-level motion vector;
      clustering the sub-CU initial motion vectors into a plurality of clusters, each cluster having an associated centroid motion vector;
      processing the centroid motion vectors by clipping any centroid motion vector in the set that falls outside a sub-CU search window so as to fall within the sub-CU search window;
      performing a search for a selected sub-CU motion vector from among the processed set of centroid motion vectors;
      performing a motion refinement search within the search window to generate a refined sub-CU motion vector; and
      predicting the sub-CU-level block with frame-rate up-conversion (FRUC) using the refined sub-CU motion vector.

* * * * *